US 6,587,875 B1

(12) United States Patent
Ogus

(10) Patent No.: US 6,587,875 B1
(45) Date of Patent: *Jul. 1, 2003

(54) NETWORK PROTOCOL AND ASSOCIATED METHODS FOR OPTIMIZING USE OF AVAILABLE BANDWIDTH

(75) Inventor: Aaron W. Ogus, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/303,067

(22) Filed: Apr. 30, 1999

(51) Int. Cl.$^7$ ............................................. G06F 15/173
(52) U.S. Cl. ................. 709/223; 709/224; 709/232-235
(58) Field of Search ................. 709/223, 224, 709/232, 233, 234, 235

(56) References Cited

U.S. PATENT DOCUMENTS

| | | | |
|---|---|---|---|
| 4,725,834 A | | 2/1988 | Chang et al. |
| 4,926,446 A | * | 5/1990 | Grover et al. ............... 375/358 |
| 5,400,329 A | * | 3/1995 | Tokura et al. ............... 370/232 |
| 5,477,531 A | * | 12/1995 | McKee et al. ............... 370/249 |
| 5,488,609 A | * | 1/1996 | Hluchyj et al. ............. 370/232 |
| 5,802,106 A | * | 9/1998 | Packer ........................ 370/229 |
| 5,870,557 A | * | 2/1999 | Bellovin et al. ............ 709/224 |
| 6,061,722 A | * | 5/2000 | Lipa et al. .................. 709/224 |
| 6,075,769 A | * | 6/2000 | Ghanwani et al. .......... 370/229 |
| 6,212,162 B1 | * | 4/2001 | Horlin ........................ 370/229 |
| 6,240,462 B1 | | 5/2001 | Agraharam et al. |
| 6,252,851 B1 | * | 6/2001 | Siu et al. .................... 370/236 |
| 6,310,892 B1 | * | 10/2001 | Olkin ......................... 370/473 |

FOREIGN PATENT DOCUMENTS

EP          601260 A1  *  6/1994

OTHER PUBLICATIONS

"Experience with TCP Vegas from SunOS 4.1.3 to NetBSD 1.0," http://netweb.usc.edu/yaxu/Vegas/Html/vegas.html, pp. 1–3, printed from the Internet Jul. 22, 1999.

A collection of papers on TCP Vegas, http://netweb.usc–edu/yaxu/Vegas/Reference/index.html printed from the Internet Jul. 22, 1999.

Brakmo, et al., "TCP Vegas: End to End Congestion Avoidance on a Global Internet," *IEEE Journal on Selected Areas in Communications*, 13(8): 1465–1480, Oct. 1995.

Ahn, et al. "Evaluation of TCP Vegas: Emulation and Experiment," http://excalibur.usc.edu/research/vegas/doc/vegas.html, pp. 1–11, SIGCOMM '95, 1995.

(List continued on next page.)

*Primary Examiner*—Nabil El-Hady

(57) ABSTRACT

A network protocol and associated methods for optimizing use of available bandwidth across a network under varying traffic conditions. The protocol and methods allow the available bandwidth for a link connecting two computers to be determined on an ongoing basis. A method for measuring a clock bias between two computers linked in communication is also presented, along with methods for determining link saturation and dropped messages. The message send rate of the link can be continually tuned based on the measured bandwidth, link saturation condition, number of backlogged messages and/or detection of dropped messages. The protocol and methods preferably are implemented as part of an application program interface. The protocol resides at the application layer, and can be used for various network protocol suites, including TCP/IP and IPX/SPX.

18 Claims, 14 Drawing Sheets

OTHER PUBLICATIONS

Xu, et al. "TCP Vegas: The Vegas/NetBSD Project," cover page and pp. 1–22, Nov. 15, 1995.

Yu, Alex, "Large Internet Packet, Packet Burst Protocol and Sliding Window", http://seamonkey.ed.asu.edu/~alex/computer/novell/LIP PBP.html, printed from the Internet Jul. 22, 1999.

Van Jacobsen and Michael J. Karels, "Congestion Avoidance and Control," SIGCOMM '88[11], Nov., 1988, pp. 1–21.

Lawrence S. Brakmo, Sean W. O'Malley, and Larry L. Peterson, "TCP Vegas: New Techniques for Congestion Detection and Avoidance," Dept. of Computer Science, University of Arizona, SIGCOMM '93.

"USC Experience with TCP Vegas: Emulation and Experiment", http://excalibur.usc.edu/research/vegas/doc/vegas.html, pp. 1–2, printed from the Internet Jul. 22, 1999.

Experience with TCP Vegas from Sunos4.1.3 to Netbsd 1.0, http://netweb.usc.edu/yaxu/Vegas/Html/vegas.html, pp. 1–3., printed from the Internet Jul. 22, 1999.

*Apple Game Sprockets Guide*, ©Apple Computer, Inc. 1996, pp. 1–21.

"Transmission Control Protocol Darpa Internet Program Protocol Specificaton", Prepared for Defense Advanced Research Projects Agency, Sep. 1981, http://deesse.univ.lemans.fr:8003/Connected/RFC/793,index.html, http://deesse.univ–lemans.fr:8003/Conhected/RFC/793.13.html, http://deesse.univ–lemans.fr:8003/Conhected/RFC/793.21.html, printed from the Internet Jul. 22, 1999.

V. Jacobsen, Barden, R., and D. Borman, "TCP Extensions for High Performance," May 1992 http://netweb.usc.edu/yaxu/Vegas/Reference/rfc1323.txt, pp. 1–33, printed from the Internet Jul. 22, 1999.

IDirectPlay4, http://msdn.microsoft.com/library/sdkdoc/directx/cpp dpref 9qd5.htm, IdirectPlay4:Send, http://msdn.microsoft.com/library/sdkdoc/directx/cpp dpref 6dvd.htm, IDirectPlay4:Receive, http://msdn.microsoft.com/library/sdkdoc/directx/cpp dpref 9hrt.htm TCP/IP, http://msdn.microsoft.com/library/sdkdoc/directx/cpp dpover 9eih.htm, DirectPlay Protocol, http://msdn.microsoft.com/library/sdkdoc/directx/cpp dpover 9qux.htm Asynchronous Networking with the DirectPlay Ptotocol, http://msdn.microsoft.com/library/sdkdoc/directx/cpp dpover 7k8p.htm, printed from the Internet Jul. 22, 1999.

H. Schulzrinne, S. Casner. R. Frederick, and V. Jacobsen, "RTP: A Transport Protocol for Real–Time Applications," http://www.2.hunter.com/docs/rfc/rfc1889.html, Jan. 1996, pp. 1–58.

A collection of papers on TCP Vegas http://netweb.usc.edu/yaxu/Vegas/Reference/index.html printed from the Internet Jul. 22, 1999.

* cited by examiner

NETWORK PROTOCOL AND ASSOCIATED METHODS FOR OPTIMIZING USE OF AVAILABLE BANDWIDTH

RELATED APPLICATION DATA

This patent application is related to the following U.S. patent application, which is commonly assigned and is hereby incorporated by reference: Methods And Protocol For Simultaneous Tuning Of Reliable And Non-Reliable Channels Of A Single Network Communication Link by Aaron W. Ogus, U.S. application Ser. No. 09/302,559, filed concurrently with this application on Apr. 30, 1999, now U.S. Pat. No. 6,438,603 issued Aug. 20, 2002.

FIELD OF THE INVENTION

The invention pertains to computer network protocols and computer programs that implement such protocols.

BACKGROUND OF THE INVENTION

There are many instances in which it would be advantageous to be able to advance and retard data transfer rates during network data transmissions to make full use of the available bandwidth based on the current network traffic. One such instance occurs when multi-player games are played over a network, such as the Internet. The executable code for these games are often located on network servers that are accessible through various networks, such as the Internet. Alternately, some or all of the executable code for the games may be located on each of computers the players are using. One or more players can log on to the game and play against the game itself (a computer) or each other. These games typically comprise an ever-changing graphical environment that is primarily controlled by the control inputs of the various game players. For example, a game may involve several warriors facing off against one another, with one or more of the warriors being controlled by each player (or a computer). In such a game, the movements of each warrior relative to the graphical environment and the other warriors will depend on the control inputs of the players (or automated movements by the computer). For this reason, it is highly desired to transfer the user-input information to the game as rapidly as possible so that the inputs for the various players can be immediately reflected by updating the graphics displayed on each player's screen.

To understand why rapid data transfer is so desirable, consider a situation in which the data transfer carries a substantial delay. Player A activates her controls to cause one of her warriors to throw a spear at an enemy warrior. Player A aims the spear based on her perception of the current state of the game, i.e., what she sees on her screen. If the data transfer rate is rapid, the display each player sees accurately reflects (is synchronous with) the current state of the game. Conversely, if the data transfer carries a delay, the display each player sees does not accurately reflect the present game state—that is, the displays observed by the various players will not be synchronized. Under such circumstances, the players may miss their targets due to the program's inaccurate display of the positions of the other participants. This delay may also cause players to be unaware of an attack in progress from another player. Transfer delays of this type are frequently encountered when networked games are played, creating unsatisfactory game performance. A principle reason for this is conventional program development tools do not provide a built-in interface that allows the data transfer rate to be adjusted to optimize bandwidth use under varying link conditions.

Developers of multi-player networked game applications typically design games to support presumed worst-case bandwidth situations. As a result, the bandwidth usage between machines is limited to a fraction of the bandwidth available over the network link, which results in non-optimal game performance. Under such worst-case-scenario design practices, the game developer assumes a minimum available link bandwidth, such as 14.4 or 28.8 kilobaud (kilobits per second), and a maximum number of players the game will support or likely encounter. The developer may also determine the average (or maximum) size of each message that the game will transfer over the network (which she typically will seek to minimize). The developer will then calculate a maximum message sending rate based on this predetermined criteria, and the game application will send messages at this calculated transfer rate. For example, in a peer-to-peer game, where messages are distributed to all players from each machine, the following equation can be used to determine the maximum sending rate:

$$R = \frac{bw}{cb*(n-1)} \quad (1)$$

wherein R is the maximum message sending rate in messages per second, n is the number of players in the game, cb is the number of bytes in a message, and bw is the assumed bandwidth.

Unfortunately, the use of static calculations of this sort leads to a number of problems, including: (1) the application can't compensate for variation in headers due to the underlying transport; (2) the application will under-utilize the link in situations where more bandwidth is available than originally presumed; and (3) the application will not be able to adjust the message sending rate to compensate for other traffic on the link. In addition, when the conditions on the link are actually worse than the initial assumptions, sending messages at the statically-determined rate will lead to the link being backlogged. That is, the rate at which the application sends messages may exceed the link's capabilities, causing messages to build up in the sending computer or on a router in the network, resulting in: increased apparent latency that can grow without bound, eventually making the game unplayable and ultimately causing the link to timeout.

A solution to all of the above problems is for the application to be able to make on-the-fly changes to the message send rate based on continuous measurements of the varying link conditions. In order to provide a platform (i.e. programming interface) for this solution, the platform must be able to determine the actual available bandwidth between two computers on a continuous basis. It is also preferable that the platform be able to detect link saturation and clear out backlogged messages. The platform must then be able to inform the application of the available bandwidth and link conditions so that the transmission code in the application can adapt to the prevailing network conditions.

SUMMARY OF THE INVENTION

The invention addresses the foregoing problems by providing a network communication protocol and associated methods for implementing the protocol that enable application programs to tune message send rates to optimize use of the available network bandwidth under varying network conditions. The network protocol is preferably implemented in an application program interface (API) that allows programmers to use features of the invention through a set of API calls. The network protocol resides at the application layer, providing a tool for application programs to use a variety of network protocol suites, including TCP/IP and IPX/SPX.

According to a first aspect of the invention, the network protocol allows application programs to determine the available bandwidth between two computers that are linked in communication across a network. Outbound messages are sent from a first local computer to a second remote computer, with the remote computer returning an acknowledge message for each outbound message. The local computer records the send time for each outbound message and includes a message identifier in the message. Each acknowledge message is timestamped with the time it is sent from the remote computer, and includes a count of the bytes received from the local computer and an identifier that matches the message identifier of the corresponding outbound message. The message identifier is used to ensure that the acknowledgement messages are correctly matched with outbound messages. A clock bias between the computers is calculated based on the local time the outbound messages are sent and the remote time they are received by comparing the send times with the acknowledge message timestamps. The rate the outbound messages are sent is increased until the link becomes saturated, which is detected by observing an increase in outbound latency based on changes in clock bias and roundtrip latency. The outbound bandwidth is calculated by calculating a difference in bytes received based on the byte counts in acknowledgement messages, and dividing the result by a difference in the time stamps of the acknowledgement messages.

According to another aspect of the invention, the network protocol facilitates a method for maintaining a clock offset between two computers linked in communication across a network. The method comprises sending messages between a first local computer and a second remote computer across the network, whereby receipt of the local computer's messages are acknowledged by the remote computer. Local send times in local clock time and timestamps based on remote clock times are tracked to calculate a clock offset between the two computers. The clock offset preferably is continually tracked and updated during transmission of multiple messages.

The network protocol and associated methods allows application programs to maximize the use of available network bandwidth, thereby improving the performance of the program. A plurality of messages is sent from a first computer linked in communication to a second computer across a network while increasing the rate the messages are sent according to a predetermined scheme until link saturation (and detection thereof) occurs, creating a backlog of messages. The predetermined scheme also continuously pushes up the send rate until message dropouts are detected, at which point it makes a step reduction of the send rate, and starts pushing up the send rate again. The link saturation and detection may also result from increased link usage by other users on the network. The present bandwidth of the link is then calculated, along with a wait time for stalling issuance of any new messages until the backlogged messages are cleared. Issuance of messages are then stalled for the wait time, and the message send rate is throttled back to the calculated bandwidth, and then the rate at which messages are sent is ramped up again. The process preferably is repeated on a continual basis so as to adjust the message send rate to take advantage of the latest bandwidth and backlog measurements.

The foregoing methods can also be implemented in application programs that enable more than two computers to be linked in communication across a network, such as the case that exists when multiple players in a peer-to-peer relationship to one another are playing a game over a network. The message send rate can be tuned for each peer-to-peer relationship, maximizing the use of available bandwidth across the peer-to-peer link.

Further advantages and features of the invention will become apparent with reference to the following detailed description and accompanying drawings.

DETAILED DESCRIPTION

In order to transfer data over a network, it is necessary to have a set of rules so that every portion of the transfer sequence is properly executed. Each of these rules is called a protocol, and a set of rules is called a protocol suite. The most common set of protocols that are used when transferring data over the Internet and various other networks such as LANs (local area networks) and WANs (wide area networks) is provided by the TCP/IP protocol suite (Transmission Control Protocol/Internet Protocol). The TCP/IP protocol suite allows a variety of different types of computers, running different operating systems, to communicate with each other. TCPIIP forms the basis for the worldwide Internet (Internet), a wide area network of more than one million computers that literally spans the globe. It is common to refer to a protocol suite by its acronym alone, e.g. TCP/IP, or by the acronym followed by "protocol", e.g., the TCP/IP protocol.

The are many other network protocol suites in addition to the TCP/IP suite, including, IPX/SPX (Internet Packet Exchange/Sequenced Packet Exchange), and NetBios. Although originally developed by independent research groups, most network protocols are open (nonproprietary) standards, many of which are published as a series of numerically-ordered RFC (Request for Comment) papers. For example the IP protocol is RFC 791. The RFC papers are readily available on the Internet or at a various libraries.

Although distinct, each of these network protocol suites are similar in structure, comprising a set of layers, with each layer responsible for a different facet of the communication task. For simplicity, the discussion below will primarily pertain to the use of the invention when using the TCP/IP protocol. However, it should be recognized by those skilled in the art that although the principles of the invention are described in reference to the TCP/IP protocol, the invention can also be applied to various other network protocols as well.

Figure 1:
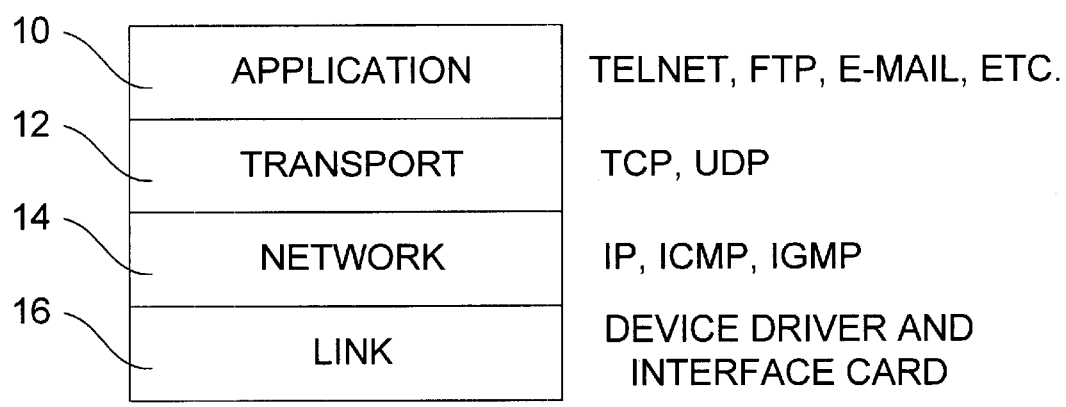
FIG. 1 shows the four layers of the TCP/IP protocol suite.

As shown in FIG. 1, TCP/IP is normally considered to be a 4-layer system comprising an application layer 10, a transport layer 12 a network layer 14, and a link layer 16. Each layer is responsible for handling various tasks, as follows.

The link layer 16 (also referred to as the data-link layer or the network interface layer) normally includes the device driver in the operating system and the corresponding network interface card in the computer. Together they handle all the hardware details of physically interfacing with the network media being used, e.g. Ethernet cable, etc.

The network layer 14 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 12 provides an interface between the network layer 14 and the application layer 10 that facilitates the transfer of data between two host computers. In the TCP/IP protocol suite there are two distinctly different transport protocols: TCP (Transmission Control Protocol) and UDP (User Datagram Protocol). TCP provides a reliable flow of data between two hosts. It is concerned with things such as dividing the data passed to it from the application into appropriately sized chunks for the network layer below, acknowledging received packets, setting timeouts to make certain the other end acknowledges packets that are sent, etc. When using TCP, the application layer can ignore all these reliability details since they are handled by the transport layer. Conversely, UDP provides a much simpler service to the application layer. It merely sends packets of data called datagrams from one host to the other, without providing any mechanism for guaranteeing that the data is properly transferred. The reliability functionality must be performed by the application layer when using UDP.

The application layer handles the details of the particular application. There are many common TCP/IP applications that almost every implementation provides, including (1) Telnet for remote login; (2) FTP, the File Transfer Protocol; (3) SMTP, the Simple Mail Transfer protocol, for electronic mail, and (4) SNMP, the Simple Network Management Protocol.

Figure 2:
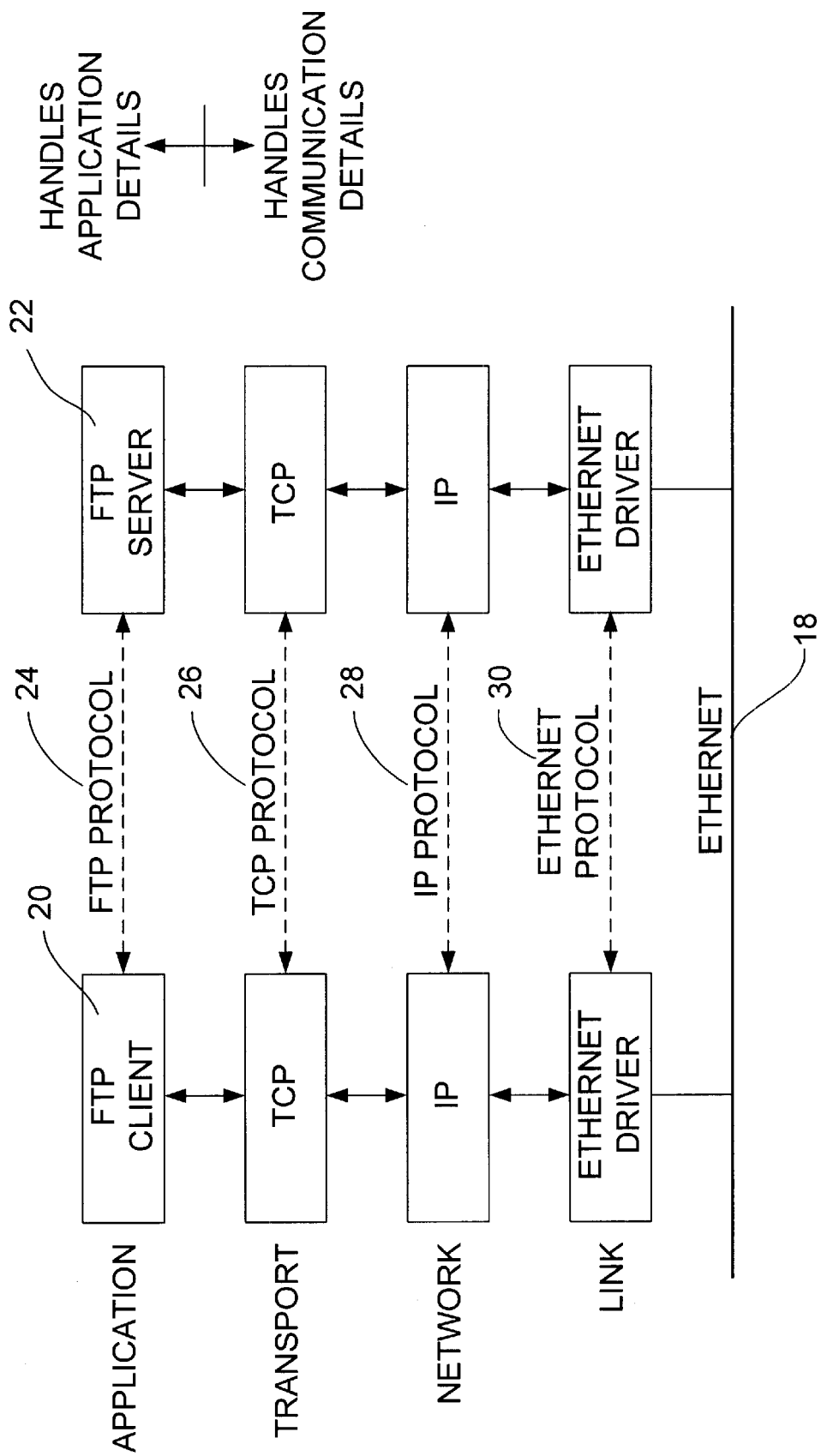
FIG. 2 shows the protocols that are used under TCP/IP when two hosts on a LAN are running FIP.

FIG. 2 shows the protocols of a simple network comprising two Ethernet hosts on an Ethernet LAN 18, both running FTP. At the application layer, the network comprises an FTP client 20 and an FTP server 22. Most network applications are designed so that one end is the client and the other side is the server. The server provides some type of services to various clients, in this case, access to files on the server host.

Each layer has one or more protocols for communicating with its peer at the same layer. These communication protocols include the FTP protocol 24 at the application layer, the TCP protocol 26 at the transport layer, the EP protocol 28 at the network layer, and the Ethernet protocol 30 at the link layer. It is common for the application layer to handle user processes, while the lower three layers (transport, network and link) are implemented in the kernel of the operating system, such as UNIX or the Windows NT® operating system. In addition, the application layer is only concerned with the details of the application and is not concerned with the details of the movement of data across the network. Conversely, the lower three layers are only concerned with the communication details and usually know nothing about the application.

For example, the purpose of the network interface layer is to handle the details of the communication media (Ethernet, token ring, etc.), while the purpose of the application layer is to handle one specific user application (FTS, Telnet, etc.).

Computer networks have developed from simple LANs comprising a handful of computers to complex WANs comprising a network of networked computers. The first computer networks were motivated by the realization that it would be advantageous to provide communication links between stand-alone computers. The concepts used in these originals, networks have fueled the development of today's internets, which comprise a network of networks that use the same protocol suite. Such internets allow a computer on one network to communicate with any one or more computers on the other networks, allowing the data across all of the computers comprising all of the networks to be shared.

Figure 3:
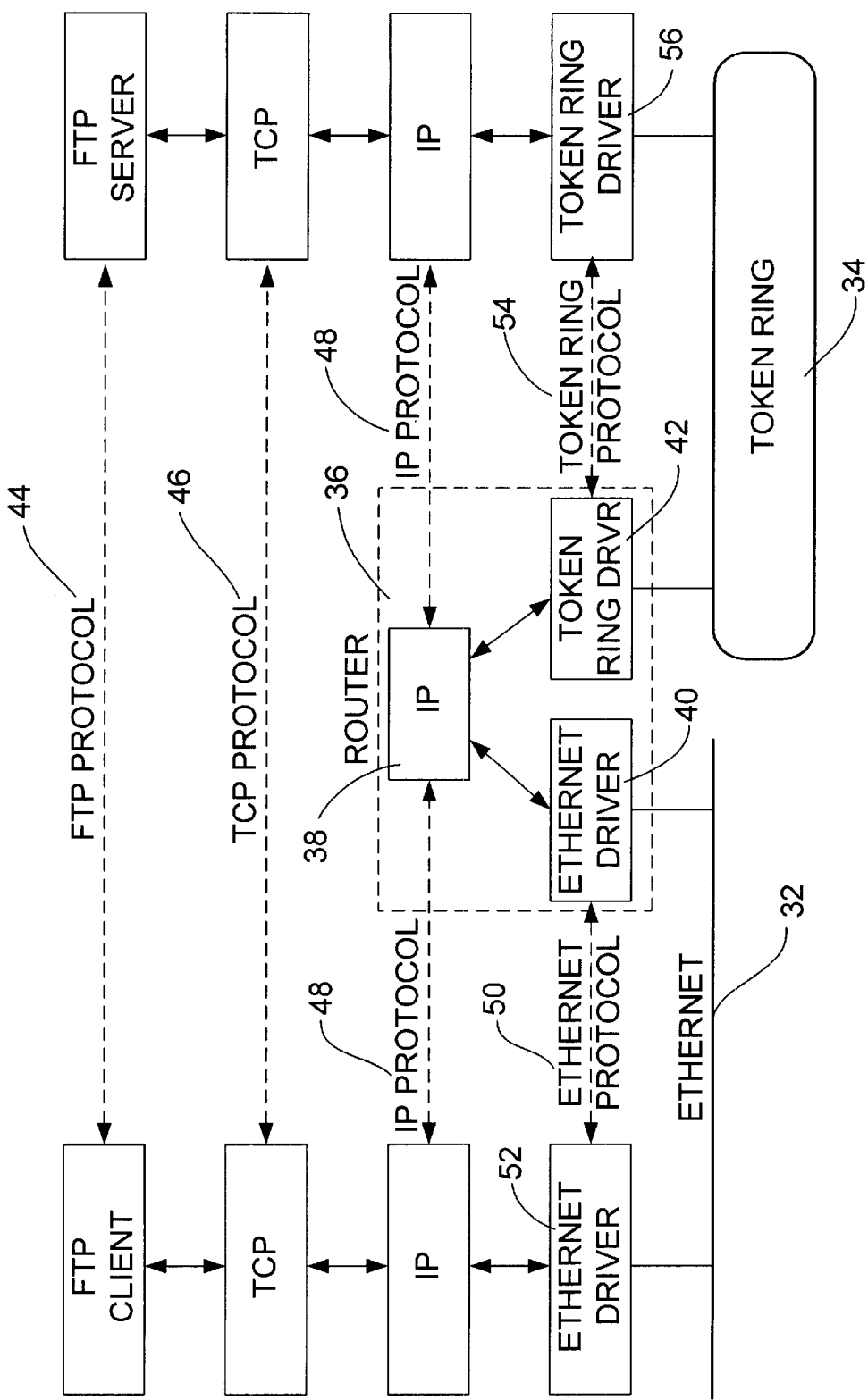
FIG. 3 shows the protocols that are used under TCP/IP when Ethernet and token ring networks are connected with a router.

The easiest way to build an internet is to connect two or more networks together with a router. Typical routers comprise a special-purpose hardware box with input and output connections and dedicated hardware and/or embedded software that allow many different types of physical networks to be connected, such as Ethernet, token ring, point-to-point links, etc. FIG. 3 shows an internet comprising an Ethernet network 32 connected to a token ring network 34 by a router 36. Although FIG. 3 only shows two hosts in communication, any host on the Ethernet network can communicate with any host on the token ring network. The router 36 comprises a network layer module 38 (an IP module in this case), and appropriate network drivers for connecting to the hostnetworks, namely an Ethernet driver 40 and a token ring driver 42.

As shown in FIG. 3, a different communication construct is used between an end system (the two hosts on either side) and an intermediate system (the router in the middle) than was shown in the FIG. 2 network. The application layer and the transport layer use end-to-end protocols (FTP protocol 44, TCP protocol 46). The network layer provides a hop-to-hop protocol that is used on the two end systems and every intermediate system in between (for clarity only one intermediate system is shown here). For instance, the EP module 38 of the router 36 is connected to the two hosts by IP protocols 48. There are also link layer protocols that are specific to the various types of host networks that are connected to the router to handle communication between the networks and the router at the link layer. Thus, an Ethernet protocol 50 is used to handle communications between the Ethernet driver 40 in the router 36 and the Ethernet driver 52 of the hosts on the Ethenet network 32, while a token ring protocol 54 is used to handle communications between the token ring driver 42 of the router 36 and the token ring driver 56 of the hosts on the token ring network 34.

In the TCP/IP protocol suite the network layer, IP, provides an unreliable service. It's job is to move a packet of data from a source to a destination, but it provides no mechanism for guaranteeing delivery, or even being able to determine if a proper transfer has occurred. This is where the TCP layer comes into play TCP provides reliability services to ensure that data is properly transmitted between two hosts, including dropout detection and retransmission services.

A router has two or more network interface layers (since it connects two or more networks). Any system with multiple interfaces is called multihomed. A host can also be multihomed, but unless it specifically forwards packets from one interface to another, it is not called a router. Also, routers need not be special hardware boxes that only move packets around an internet. Most TCP/IP implementations allow a multihomed host to act as a router, but the host needs to be specifically configured to support this use. In such instances, we can call the system either a host (when an application such as FTP or Telnet is being used) or a router (when it's forwarding packets from one network to another.

Another way to connect networks is with a bridge. Bridges connect networks at the link layer, while routers connect networks at the network layer. Bridges make multiple LANs appear to the upper layers as a single LAN.

One of the most powerful features of an internet is the ability to hide all the details of the physical layout of the Internet from the applications. This allows the application layer to be oblivious to the underlying structure of the network; in fact, it can't and doesn't care if there is a pair of networks connected by a single router, or a multitude of routers and bridges connecting multiple physically-distinct networks.

Figure 4:
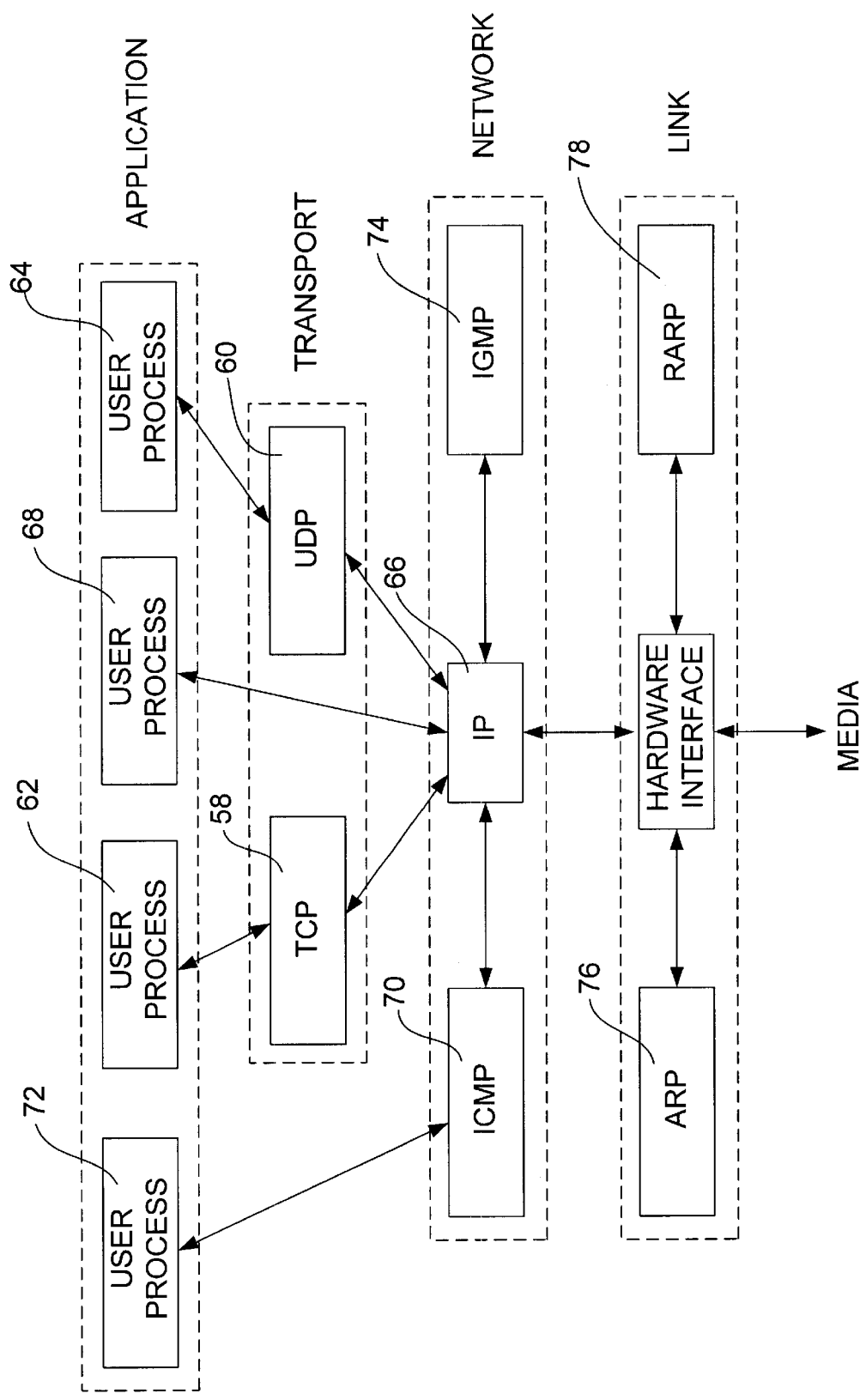
FIG. 4 shows various protocols at the different layers of the TCP/IP protocol suite.

In addition to the foregoing protocols, the TCP/IP suite includes a variety of other protocols, several of which are shown in FIG. 4. As discussed above, the primary transport layer protocols are TCP protocol 58 and UDP protocol 60. User processes 62, 64 at the application layer, respectively, use TCP services when reliable transport is required, and use UDP services when reliable service is unnecessary. Both TCP 58 and UDP 60 use the IP layer 66, the main protocol at the network layer. Every piece of TCP and UDP data that gets transferred around an Internet goes through the IP layer at both ends of a link system and at every intermediate router. It is also possible (but rare) for a user process to access IP directly, as is the case with user process 68.

The network layer includes protocols in addition to IP. One such network protocol is the. Internet Control Message Protocol (ICMP) 70, which is an adjunct to the IP protocol 66. ICMP is used by the IP layer to exchange error messages and other vital information with the IP layer in another host or router. The ICMP protocol may be accessed from a user process directly, as is shown with user process 72. Another network level protocol is the Internet Group Management Protocol (IGMP) 74. IGMP is used with multicasting, i.e., sending a UDP datagram to multiple hosts.

ARP (Address Resolution Protocol) 76 and RARP (Reverse Address Resolution Protocol) 78 are specialized protocols used only with certain types of network interfaces (such as Ethernet and token ring) to convert between the addresses used by the IP layer and the addresses used by the network interface.

Figure 5:
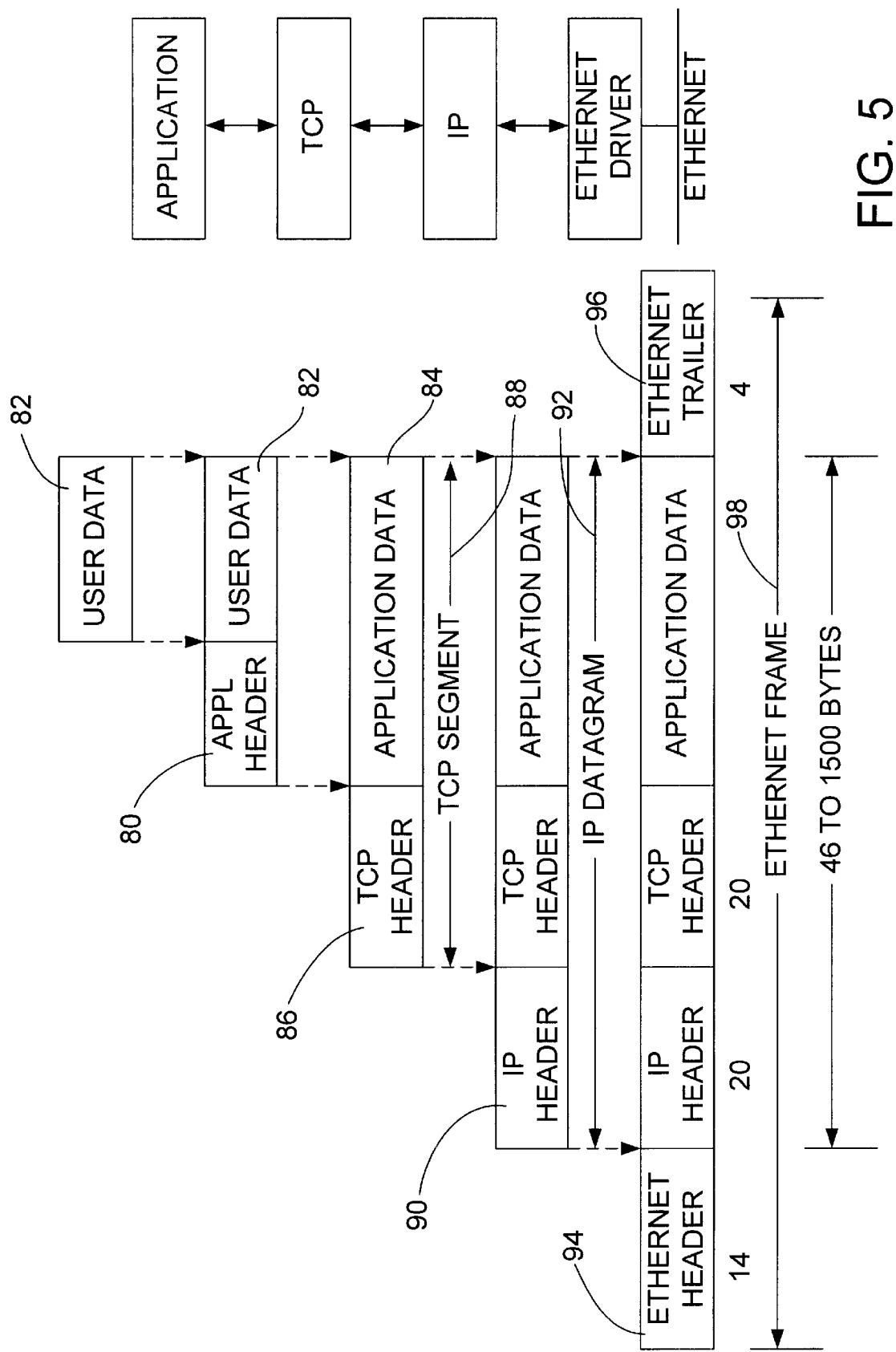
FIG. 5 shows the format of data as it traverses the TCP/IP protocol stack.

When an application sends data using TCP/IP, the data is sent down a protocol stack, through each layer, until it is sent as stream of bits across the network. As shown in FIG. 5, each layer adds information to the data by prepending headers (and sometime adding trailer information) to the data that it receives. For instance, at the application layer an application header 80 is prepended to user data 82 to form application data 84. At the transport layer a transport protocol header is prepended to the application data. In the case of FIG. 5 the transport layer is TCP, and therefore a TCP header 86 is prepended to the application data 84, thereby forming a TCP segment 88 that is sent to the network layer IP. The TCP header 86 comprises 20 bytes. Similarly, at the network layer a network layer header is prepended to the transport layer data. In the case of TCP/IP, an IP header 90 is prepended to the TCP segment 88 to form an IP datagram 92. The IP header 90 also comprises 20 bytes. Finally, at the link layer a media header such as Ethernet header 94 is added to the data received from the network layer to from a frame of data. In some instances, such as when the media is Ethernet, a media trailer is also appended to the end of the data. For instance, in FIG. 5 an Ethernet trailer 96 is appended to the Ethernet Header 94 and the IP datagram 92 to form an Ethernet frame 98. The Ethernet frame comprises the stream of bits that flow across the network that correspond to the original application message data. The numbers (14, 20, 20, 4) at the bottom of the headers are typical sizes of the headers in bytes, e.g., the Ethernet header 94 comprises 14 bytes, etc.

A substantially similar diagram could be drawn for UDP data. The only changes are that the unit of information the UDP passes to EP is called a UDP datagram, and the size of the UDP header is 8 bytes (vs. 20 bytes for the TCP header).

The size of the frame will be limited by the maximum transmission unit (MTU) of the type of network being used to transfer the data packet. For example, the MTU of an Ethernet network is 1500 bytes. The ultimate size of the data packets is only a concern at the network and link layers, and is not a concern to the application. The network layer automatically performs fragmentation (breaking the datagram up into smaller pieces) so that each fragment is smaller than the MTU of the network.

Recall from FIG. 4 that TCP, UDP, ICMP, and IGMP all send data to IP. IP must add some type of identifier to the IP header that it generates, to indicate which layer the data belongs to. IP handles this by storing an 8-bit value in its header called the protocol field. A value of 1 is for ICMP, 2 is for IGMP, 6 is for TCP, and 17 is for UDP.

Figure 6:
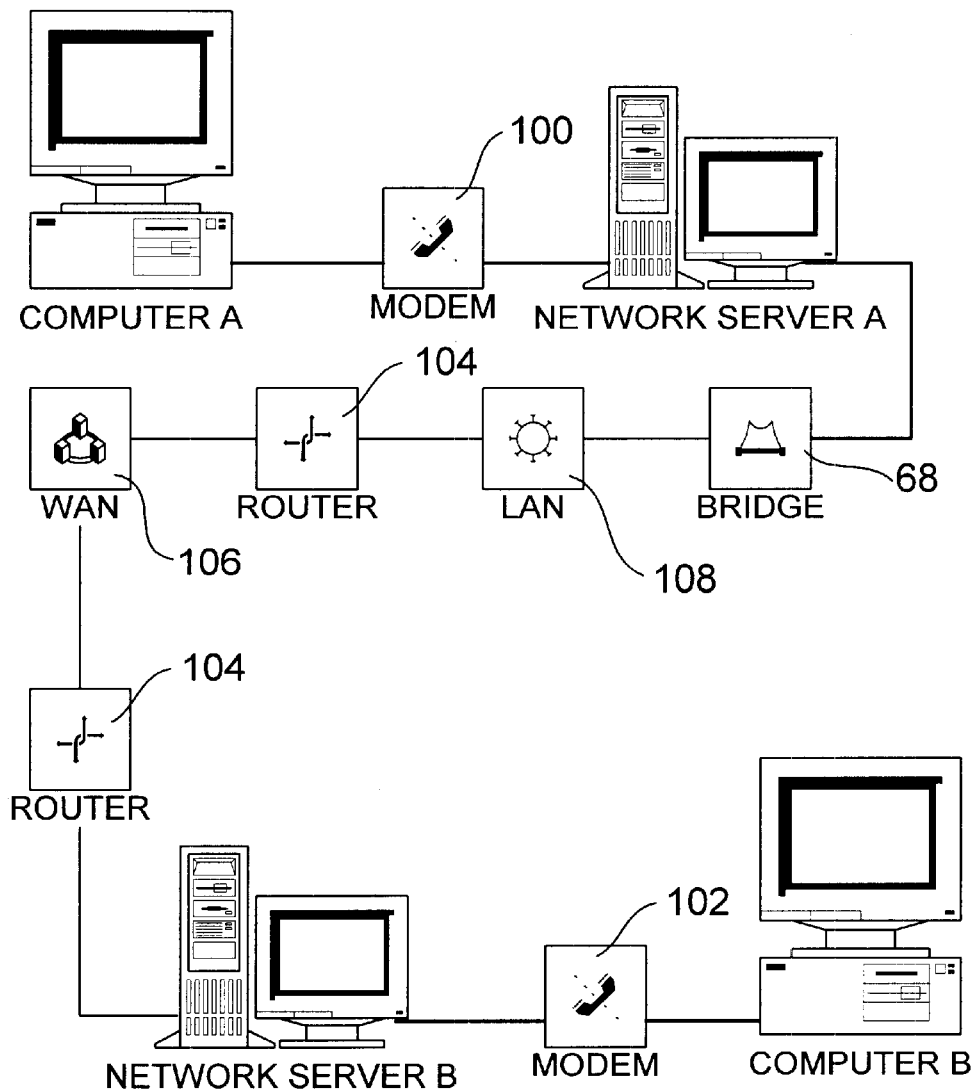
FIG. 6 shows an example of a communication path across an internet.

FIG. 6 shows a typical communication connection path that exists when two computers communicate with each other over an internet. Computer A is connected to network server A through a modem 100, such as a 28.8 kilobaud modem. In the case of communications over the Internet, the network server A may be a server provided by a local Internet Service Provider (ISP). Computer B is likewise connected to a separate network server B through a second modem 102. Modems 100, 102 may alternately be higher speed links such as ISDN lines, T1 lines, etc. Network servers A and B are connected to each other over a network comprising a plurality of routers 104 and bridges 106 that connect various networks such as WAN 106 (e.g. the Internet) and LAN 108.

The Protocol for the DirectPlay[7] API

In order to determine how fast data can be sent between Computers A and B, we must first determine the available bandwidth between the computers, given prevailing network conditions. Unfortunately, there is no instrumentation that exists on networks or that could be placed on networks that can measure the available bandwidth between any two arbitrary computers connected across the network. One way to overcome this problem is to determine the bandwidth between Computers A and B by saturating the link over a period of time and observing the rate at which data sent by Computer A arrives at Computer B.

The DirectPlay[7] API provides send and receive functions that application programs can call to send and receive application messages via the DP protocol. An "application message" refers to the unit of data that an application program identifies for transmission when it calls the send function. The size of the application message may be bigger or smaller than the size of the messages that the DP protocol constructs to send to its counterpart DP protocol on another computer. In the context of this document, we refer to the DP protocol messages generally as "messages." In some cases, the DP messages are referred to as frames. The DP protocol may use a variety of different transport protocols, called service providers, to send its messages to a counterpart DP protocol on another computer. The manner in which a service provider transfers the data in a DP message may vary depending on the type of service provider.

Since the only physical connection between the computers is the network itself, the observation information necessary to determine link saturation is fed back to the transmitting computer. Although this information could be transmitted as separate messages apart from the delivery protocol for messages, it is preferable to integrate both functions into a single protocol.

It is possible to determine when a link is saturated by assuming a small bandwidth and then increasing the send rate until link saturation is observed. In order to accomplish this determination, it is necessary to be able to measure the latency between message transmission and reception, i.e., how long it takes a message to traverse between Computer A and Computer B. A problem with using conventional protocols for this task is that conventional protocols do not provide a way for distinguishing between an original message and a retry message. This problem can be overcome by using a protocol called the DirectPlay protocol (hereinafter the DP protocol), which, in part, provides a message serial number field in its header so that original and retry messages can be distinguished.

Figure 7:
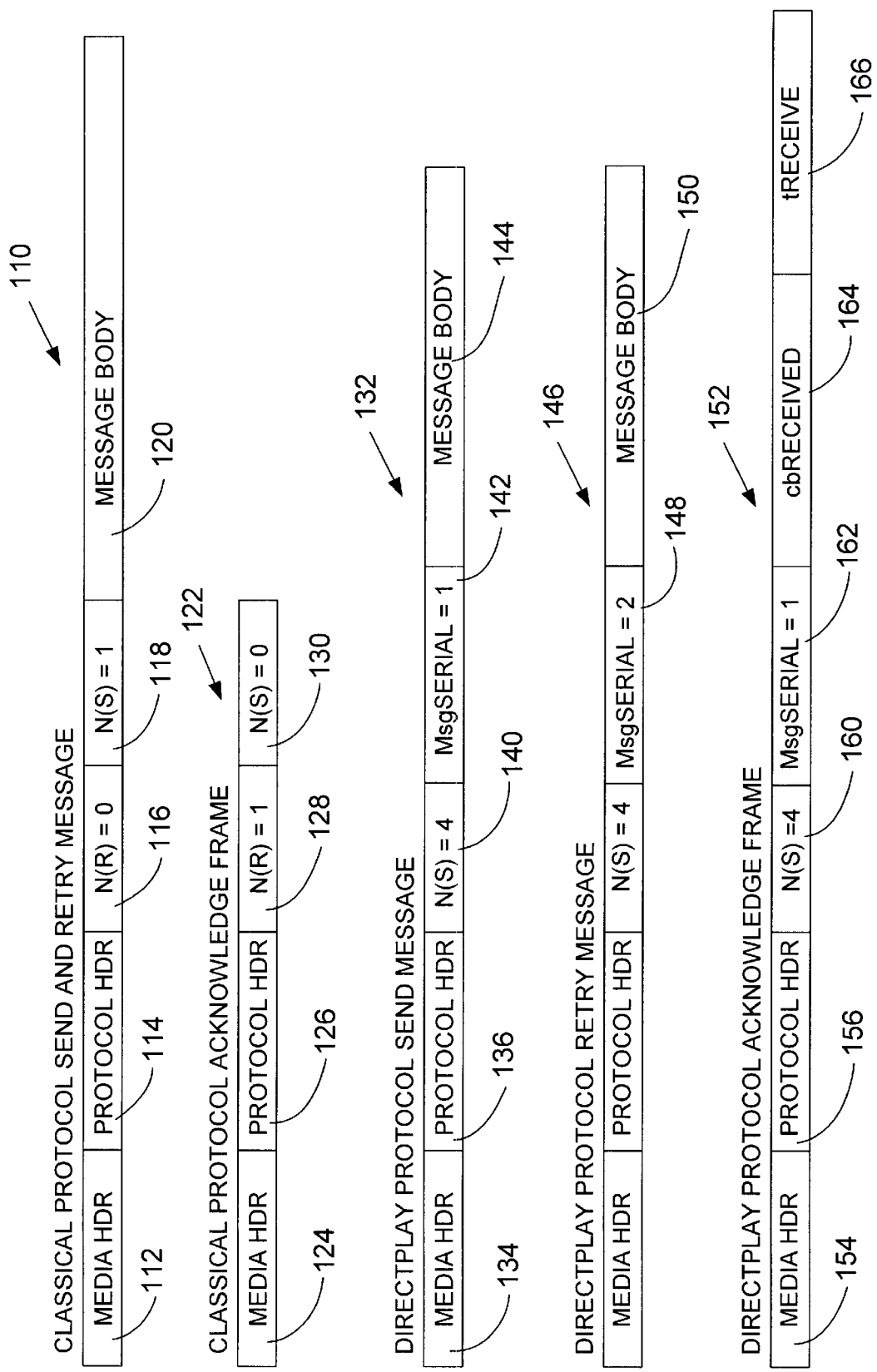
FIG. 7 shows a comparison between the headers of classical protocols and the headers of the protocol in an implementation of the invention.

FIG. 7 illustrates the difference between classical protocol headers of send, retry, and acknowledge messages and the equivalent DP protocol headers for the same. A classical protocol send or retry message typically comprises a media header 112, a protocol header 114, a received sequence number field 116, a send sequence number field 118, and a message body 120. The media header 112 will be particular to the type of network, e.g., an Ethernet header for an Ethernet network, etc. The protocol header will depend on the transport and network layer protocol used, such as TCP/IP, IPX/SPX, Netbios, etc. The received sequence number field 116 provides an identifier to the last sequence number reliably received by the computer. The send sequence number 118 corresponds to the relative sequential number of the message. The message body contains the application data that is being sent between the source and destination computers.

The classical protocol acknowledge frame 122 comprises a media header 124, a protocol header 126, a received sequence number field 128, and a send sequence number field 130. These fields are analogous to the fields described above which share the same name. The acknowledge frame 122 is sent by the receiving computer to acknowledge receipt of a send or retry message.

The DP protocol headers augment the classical protocol headers to provide additional information pertaining to a message identifier, a count of the number of bytes received at the destination computer, and timestamp information. For instance, a DP protocol send message 132 includes a media header 134, a protocol header 136, a send sequence number field 140, a message serial number field 142, and a message body 144. The media header 134, protocol header 136, send sequence number field 140, and message body 144 are similar to the like-named fields described above. The message serial number field 142 is used to provide a unique identifier for each message so that each message can be accurately tracked. In particular, the DP protocol increments the message serial number each time it re-sends a message to distinguish among the original message and re-sent messages having the same sequence number.

While the DP protocol uses the sequence number and message serial number as a unique message identifier, there are alternative ways to implement a unique message identifier. For example, the protocol could use other distinguishing characteristics to identify a message and match it with an acknowledge message, such as pseudo-random numbers or universally unique numbers (e.g., a GUID in the Direct-Play® API).

The fields for a DP protocol retry message 146 are identical to the fields that comprise the DP protocol send message 132. However, the value of the message serial number field 148 in the retry message header will differ from the message serial number field 142 value of the corresponding original message. For example, suppose that the message body portions 144, 150 of the respective send message 132 and retry message 146 are identical—that is, message 132 is an original message and message 146 is a retry of message 132. All the header fields in both messages are identical except for the message serial number values, as is shown by comparison with message serial number field 142 with message serial number field 148.

Acknowledge frame 152 illustrates the fields that comprise an acknowledge message under the DP protocol. The acknowledge frame 152 includes a media header 154, a protocol header 156, a send sequence number field 160, a message serial number field 162, a count of bytes received (cbRECEIVED) field 164, and a timestamp (tRECEIVE) field 166. The like-named fields are similar to those described above, except that the message serial number field corresponds to the message that is being acknowledged instead of the present acknowledge message. The cbRECEfVED field 164 records the count of bytes received at the destination machine. The tRECEIVE field 166 holds a timestamp that is created at the time messages are received by the destination computer. The cbRECEIVED and tRECEfVE fields provide the basis for determining the receive rate at the destination computer. These values are also used to isolate which part of a round-trip latency can be attributed to the outbound path and the return path.

The DP protocol makes a request for an acknowledge by setting an acknowledge request flag in an outbound message. The acknowledge message serves the dual purpose of gathering operational characteristics about the network link as well as implementing reliable delivery. Reliable delivery, in this context, refers to re-transmitting messages that the remote computer did not receive, and is not necessary to maintain operational characteristics about the link. When the DP protocol of the remote computer receives a message with a set acknowledge request flag, it sends an acknowledge message in response. The DP protocol sends an acknowledge for each message requesting one. In the case where it receives a message out of sequence, it sends an acknowledge with a list indicating which message(s) were not received (e.g., a negative acknowledge list or NACK list). It sends an acknowledge in the case where all messages in a window have been received. On the sending computer, the DP protocol re-transmits messages that have been specifically enumerated in the NACK list.

The DP protocol allows acknowledge messages to be sent in a delayed fashion, rather than immediately upon receipt of a message requesting an acknowledge. In this case, the DP protocol in the acknowledging computer adds a field to the acknowledge message indicating how long it was delayed in the acknowledging computer. This allows the acknowledging computer to "piggyback" the acknowledge information on a returning data frame if the link is being used bi-directionally. The delay time field allows the statistics for the outbound and return path to be isolated properly.

Since the DP protocol is implemented at the application layer, it can be used with a variety of different transport layer protocols, including TCP, UDP, IPX, comm links, modem-to-modem (TAPI) links, etc. However, it is preferable to use the DP protocol with transport layer protocols that do not provide built-in reliable transfer features. This is because the DP protocol an be used to reliably send datagrams over non-reliable transport services. For instance, by racking the unique message identifier and/or message sequence numbers, the DP protocol can determine if messages are dropped, whereupon it can resend the message so that it reliably reaches its destination. The discussion below concerns use of the DP protocol with datagram protocols such as UDP.

Adjusting the Message Send Rate

It is desired to send messages at a rate that will take advantage of the available bandwidth of the link without causing substantial dropouts, or message backlogs. The rate messages are sent (the message send rate) will depend on the detected link conditions. The term "message send rate" is actually somewhat of a misnomer, because what we are actually concerned with is the rate data, is sent, i.e., the data transmission rate (number of bytes sent per second), versus the number of messages sent per unit time. However, in many games (and other) applications the message size is the same, and so the rate at which messages are sent is directly related to the data transmission rate. For instance, in a game program that has a nominal message size of 100 bytes, a message send rate of 100 messages per second corresponds to a data transmission rate of 80 kilobaud.

Generally, there are three basic send rate modes, and a throttling and backlog clear-out scheme. The criteria for the basic send rate modes is shown in Table 1 below.

TABLE 1

| Mode | No Drops | One Drop | >1 Drop |
| --- | --- | --- | --- |
| Start | +50%/message | −25%, go to Meta | −50%, go to Meta |
| Meta-stable | +4%/message | −12%, stay in Meta | −25%, stay in Meta |
| Stable | +2%/message | −12%, stay in Stable | −25%, go to Meta |

Upon initiating communication across a link, the start mode is used to rapidly ramp-up the message send rate. The start mode assumes an initial bandwidth such as 28.8 kilobaud, and increases the send rate 50% with each subsequent message that is sent until a dropped message is detected. Because we are sending over UDP (or another unreliable protocol), there is no built-in scheme for detecting dropped messages. Therefore, we compare the protocol header information for the send messages with the protocol header information for the acknowledge messages to determine if any messages have been dropped. In particular, we look at the message sequence numbers to see if any acknowledge messages skip a sequence number.

Once a dropped message is detected, the send rate is reduced by 25% (or 50% if more than one message drop is detected), and the send rate mode is switched from the start mode into a meta-stable mode. In the meta-stable mode, the message send rate is increased much more slowly (4%), until one or more message drops are detected, whereupon the message send rate is decreased by 12% (or 25% is more than one message drop is detected). At this point the send rate is increased at 4% per message again, and the process is repeated.

The message send rate will stay in the meta-stable mode until a link saturation condition is detected (detection of link saturation is discussed in detail below). Upon detection of link saturation, the outbound bandwidth of the link is calculated, along with a wait time that corresponds to the amount of time we should stop sending messages to clear out the backlog on the link. Once we have stopped sending messages for a period equal to the wait time, sending of messages are resumed at the calculated outbound bandwidth, and a new clock bias is calculated. The send rate mode is then switched to the stable mode shown in Table 1. In the stable mode the message send rate is increased 2% per message until one or more dropouts is detected. In the case of one dropout, the send rate is reduced by 12% and we stay in the stable mode. In the case of more than one dropout the send rate is reduced by 25% and we switch back to the meta-stable mode.

It should be noted that link saturation conditions are constantly being evaluated, and that such a condition will trump control of the data send rate mode. For instance, a link saturation condition will cause the message send rate to be changed to a recalculated outbound bandwidth regardless of what the previous send rate mode was.

Maintaining a Clock Offset Between Two Computers

The DP protocol calculates link bandwidth when the link is saturated. In order to determine if the link is saturated, it relies on detecting increases in outbound latency. Since the DP protocol can only observe round trip latency, it needs a method of isolating the outbound and return components of the round trip latency. This can be accomplished if the offset of the system clocks of the computer are known and if the acknowledge message contains a timestamp from the remote system clock of the destination computer.

When the DP protocol on Computer A sends out its first message, it is fairly safe to assume that there are no other messages between Computer A and Computer B to slow down the round trip of the first message and it's acknowledgement. Although this is a fairly safe assumption, it is not relied upon completely, but rather the assumption is used to make an initial guess at the offset between system clocks on the two machines. When any message that requires an acknowledge is sent by the DP protocol, the protocol first records the system time on Computer A and then sends the message. When Computer B receives the message, it sends an acknowledge message that includes information corresponding to the system clock reading of Computer B at the time Computer B receives the message. When Computer A, receives the acknowledge message, it calculates a clock bias between the two machines as follows:

$$Bias = tReceive_0 - tSent_0 \tag{2}$$

Where Bias, tReceive and tSent are all unsigned values of the same size, e.g. unsigned 16 or 32-bit values. tSent is the value of the system clock on the sending computer when the message was sent, while tReceive is the value of the system clock on receiving computer when the message was received.

Subsequently, when new messages are acknowledged by the receiver, the sender can determine if the Bias is growing or shrinking by the calculation:

$$\Delta Bias = Bias - (tReceive_n - tSent_n) \qquad (3)$$

Although this scheme is sound on its face for detecting increases and decreases in latency, it has a built-in difficulty that must be accounted for. Simply put, the system clocks on PC-class hardware are not very accurate. In fact, it is common for the clock drift between two computers to be as high as 0.1% or about 1 ms/sec. Given the necessity of accurate values in the algorithms the DP protocol uses, this rate of clock drift is generally unacceptable.

The clock drift problem can be overcome by employing a scheme that takes into account the following considerations: (1) the throttling algorithm used to "throttle" (reduce the message send rate on) the link when link saturation is detected is based on growth of the latency period between the two computers; (2) the DP protocol tries to push up link utilization by assuming more bandwidth becomes available over time; (3) there is an opportunity to re-establish the Bias value whenever the throttling algorithm throttles the link; and (4) shrinking latency can be used to re-establish the Bias value.

We now proceed with discussing the appropriate action to take under the various clock drift scenarios. There are three possibilities when considering the relative clock rates between the two computers, including:

1. The transmitter's clock runs slower than the receiver's clock
2. Both clocks run at the same speed.
3. The transmitter's clock runs faster than the receiver's clock.

In case 1, under a steady-state network condition the apparent latency of sent messages will appear to grow, even though the link is not saturated. This will eventually lead to the erroneous assumption that the link is saturated and cause the DP protocol to throttle the link. Any time the link is throttled, it is assumed that the backlog on the send path (packets backed up at some point in the send path) has been cleared and the subsequent send will not incur any latency due to a backlog. At this time the Bias value is recalculated. This means that sometimes we will unnecessarily throttle the link from time to time. However, since the throttle time will not exceed the total clock drift between the computers, the error due to this affect will at worst compromise 0.1% of the available bandwidth.

In case 2 there is no drift, and so our previous calculation (3) will provide accurate results of the apparent latency under varying network conditions.

In case 3, under a steady-state network condition the bias value will appear to shrink. Since any bias value smaller than the current value implies a shorter round trip, it can be taken as a "better" sample and the bias can be immediately recalculated.

The following example illustrates a typical set of Bias and ΔBias calculations. Suppose that there is a pair of computers A and B that are communicating over a network, where the clocks on computers A and B are not synchronized. After the communication link is established, computer A sends out a first message at computer A time 0 milliseconds (ms). Since the computers' clocks are not synchronized, there is no way to measure the time between when this first message is sent by A and when it is received by B. The next best thing is to record the time that B receives messages according to B's own clock. Suppose that when B receives the first message its clock reads 500 ms. B then sends an acknowledge message to A indicating that B received the first message at a B time clock reading of 500 ms. In this instance, the initial bias calculation leads to 500−0=500 ms.

The DP protocol uses this bias measurement to determine whether the latency is increasing or decreasing by use of equation (3). For instance, lets say that A sends a second message at local A time 10ms, and B receives this second message at local B time 510 ms. The change in bias (ΔBias) calculation yields 510−10−500=0. This indicates that there is no change in latency between the first message and the second message. This could be due to constant network conditions, or a change in network conditions with a corresponding difference in clock rates between the computers that exactly matches the change in the network condition. We can never be certain because of the inconsistency between computer clock rates.

At the start of a third message, the local time on computer A is now 100 ms. This third message is received by B at a local (B) time of 608 ms. The ΔBias calculation now yields 608−100−500=−2 ms. This negative value implies that either the latency has decreased, or that clock A is running faster than clock B.

Rather than use just the initial bias measurement, the bias value may be continually updated. In the current implementation, the DP protocol calculates the bias for a first message and then maintains this value as the clock bias until: 1) the send rate is reduced (e.g., in response to detecting link saturation); or 2) the bias is observed to decrease, in which case, the new, reduced bias value replaces the stored bias. In the first case, the DP protocol recalculates the bias just after reducing the message send rate in response to detecting link saturation. It calculates the bias from the send and receive times of one of the first new messages sent after adjusting the send rate and waiting for backlogged messages to clear. In the second case, the DP protocol replaces the existing bias with the new, reduced bias by computing the bias for the current message, comparing it with the stored bias, and replacing the stored bias with the current bias when the current bias is a smaller value. An alternative way to update the bias as messages are sent is to use a sliding average taken from N measurements. For example, the most recent five or ten bias measurements may be averaged to determine the stored bias value. By using these schemes, the bias value may more closely represent the actual difference between the two system clocks.

Detecting Link Saturation

During the life of a network link, the capacity of the link to handle data will vary over time. The reasons for the variations are many and can include saturation of part of the network path; saturation of the transmitting computer's connection to the network; or saturation of the receiver's connection to the network. As these "bottlenecks" in the network path shift, so does the available capacity of the end to end network link. The capacity of the entire link at a given time is limited to the capacity of the current bottleneck. There are two effects the bottlenecks may have on the data stream when they are overloaded; the bottleneck may cause data to be dropped or the local network at the bottleneck may buffer data and introduce increased latency. The proper behavior for dealing with drops due to link overload are well understood and dealt with in many protocols.

The DP protocol includes functionality to handle bottleneck situations that improve upon similar features provided by classical protocols. Just as with other protocols, the DP protocol provides a throttling feature that reduces the message send rate when excessive drops are detected. In addition, the DP protocol can set a lower bound on the throttling mechanism of classical protocols than would normally exist. The DP protocol never allows congestion control to drop the send rate below the current receive rate at the receiver. The DP protocol also provides a throttling mechanism for clearing out backlogged messages.

The first step in establishing available link bandwidth is to detect when the link is saturated. The criteria that the DP protocol uses to determine when the link is saturated is when the round trip latency of the link grows to a point where there is a high level of confidence that the increased latency is due to a backlog on the link. In order for there to be a backlog on the link, the sending rate must exceed the capacity of the link's bottleneck and cause buffering of messages as they wait to be transmitted. This situation is typically encountered when the message transmission rate exceeds the network bandwidth (capacity) at the bottleneck.

The link saturation determination involves a two-criteria process. The first criterion involves a statistical calculation that measure the increase in the round-trip latency relative to an average round-trip latency. One way to perform this statistical calculation is to use the standard deviation value. The standard deviation $\sigma$ is the square root of the variance of a set of measurements, and is determined as follows:

$$\sigma^2 = \frac{\sum (x-\mu)^2}{N} \qquad (4)$$

where $\mu$ is the mean (average) of the set of measurements, x is an individual measurement, and N is the total numbers of measurements in the set. Once the standard deviation is determined a bouridary can be set for making the link saturation determination. The DP protocol uses a boundary of plus three standard deviations or $3\sigma$. For instance, if the round-trip latency measurement exceeds the average round-trip latency $+3\sigma$, then this first criterion is met.

Once the first criterion is met, the DP protocol determines if the backlog is due to an increase in outbound latency. We do not want to apply a throttle in situations where the roundtrip latency increase is solely due to increased latency on the return path. A determination of whether the increase is due to outbound latency can be performed by computing the difference in clocks for the latest send message and comparing it to the stored Bias value. If the difference between the bias for the latest send and the stored bias accounts for a large part (e.g., ½ or greater) of the round-trip latency, then we assume the link is backlogged.

Determining Outbound Bandwidth

Once the two foregoing criteria are met, the DP protocol assumes that the link is in a backlogged state that has caused the outbound latency to increase. Two corrective actions are then taken to eliminate the backlog and adjust the sending rate so as to not reintroduce a back-logged condition on the link. First, the DP protocol calculates the receive rate at the receiver, which should be the outbound bandwidth of the link. Next, it determines how long it must wait to clear the backlog. The current implementation assumes that a reasonable approximation of the. link backlog is the current number of outstanding bytes (bytes that have not been acknowledged) minus the average latency multiplied by the.link bandwidth. Then the time to wait is the backlog divided by the bandwidth. Once the DP protocol has suspended sending new messages for that long, it can be fairly certain the backlog has cleared.

The following example is used to illustrate the calculations. The example assumes that several messages totaling 95000 bytes have already been transmitted between a local (sending) computer and a remote (receiving) computer. The message send rate has been progressively increased causing a link saturation condition to be detected in concurrence with sending of the last message. At this point an $i^{th}$ message (packet Z) is sent. The size of packet Z will generally be about 100 bytes or less.

Assume the following link conditions, determined by observing the messages prior to packet Z:

average latency, tAvgLat is 70 ms average deviation in latency, tAvgDevLat is 10 ms remote clock bias is 25,286,762

For packet Z, the following information is recorded when it is sent out:

SendTime=25,997,030 (local clock when sent)

LocalSent=100000 (bytes sent on link including packet Z)

RemoteReceived=95000 (bytes received on remote and reported back in last ACK)

RemoteReceiveTime=51,283,742 (remote clock time when bytes were received)

The local computer receives the Acknowledge for Z at local time t=25,997,150. It contains the following information:

RemoteReceivedBytes=100000 (bytes received at remote when Z arrived)

RemoteReceiveTime=51,283,855 (remotes system clock when Z arrived)

The round trip latency for Z is equal to:

$$\begin{array}{c}\text{the time the Acknowledge for Z was received–}\\ \text{the time Z was sent}\end{array} \qquad (5)$$

$$25{,}997{,}150 - 25{,}997{,}030 = 120 \text{ ms}$$

The change in bias of the Acknowledge message for Z from the stored bias value is:

$$\Delta \text{Bias Bias} - (\text{tReceive}_n - \text{tSent}_n) \qquad (3)$$

RemoteReceiveTime-LocalSendTime-Bias 51,283,855−25,997,030−25,286,762=63 ms

This calculation indicates that the latency due to link backlog is around 63 ms. However, this data is slightly out-of-date—the backlog was about 63 ms when Z was sent. If the present (real-time) latency due to link backlog actually was 63 ms then we would merely stall issuance of any new outbound messages on the link for 63 ms to allow the backlogged messages in the link to be cleared out. Unfortunately, since the data is not real-time, pausing the link for 63 milliseconds will not suffice. Instead, we determine the appropriate wait time based on a calculation that uses the calculated receive rate (at the remote computer) and a new backlog determination.

In addition to the above conditions, let's assume that we continually sent an additional 10,000 bytes of data since sending Z, so the current total sent value is 110,000 bytes. From this information we can infer that the current SendRate over the 120 ms it took to acknowledge Z is 10,000 bytes/120 ms=83333 bytes/sec.

We can now calculate the receive bandwidth bw over the period as the number of bytes received on theremote between when Z was sent and its Acknowledge received as follows:

$$bw = \frac{\text{Number of Bytes Received at Remote}}{\text{Change in Remote Receive Time}} \quad (6)$$

$$bw = \frac{100000 - 95000}{51,283,855 - 51283,742} = 41,666 \text{ bytes/sec}$$

Now we can determine the size of the pipe between the sender and the receiver. If we had been sending at the correct rate (41,666 bytes/sec) and the outbound and return latencies were about the same (say 35 ms) then we would expect 0.035 sec*41,666 bytes/sec 1458 bytes to fit in the pipe. That is, the physical link (pipe) between the machines holds 1458 bytes.

According to the example, we have sent 10,000 unacknowledged bytes. But it is reasonable to assume that 1458 bytes may have been received and still not acknowledged because of the return time for the Acknowledge to propagate across the network. Additionally, 1458 bytes may have been sent but not yet received at the remote computer. Therefore, the actual backlog is about 10,000–2*(1458) bytes or 7084 bytes. As a result, we should adjust our sending rate to 41,666 bytes/sec and wait for 7084/41666=170 ms before sending again. In addition, after this wait, the bias value can be recalculated with the presumption that there will not be an error introduced by backlogged messages on the link.

The above description of how the DP protocol functions is generally the case during most data transmissions. However, there are some conditions under which the foregoing calculations may lead to undesirable tuning parameters. Therefore, the DP protocol also provides a number of conventional methods to handle these situations. For example, if the send rate exceeds 50,000 bytes/sec, the standard DP protocol calculations are not used.

API Implementation of the DP Protocol

In order to implement the DP protocol, it is necessary to provide a mechanism that fits nto the overall network protocol layering scheme. This is accomplished by providing the DP rotocol functionality through a set of DirectPlay[7] API (Application Program Interface) calls.

Figure 8:
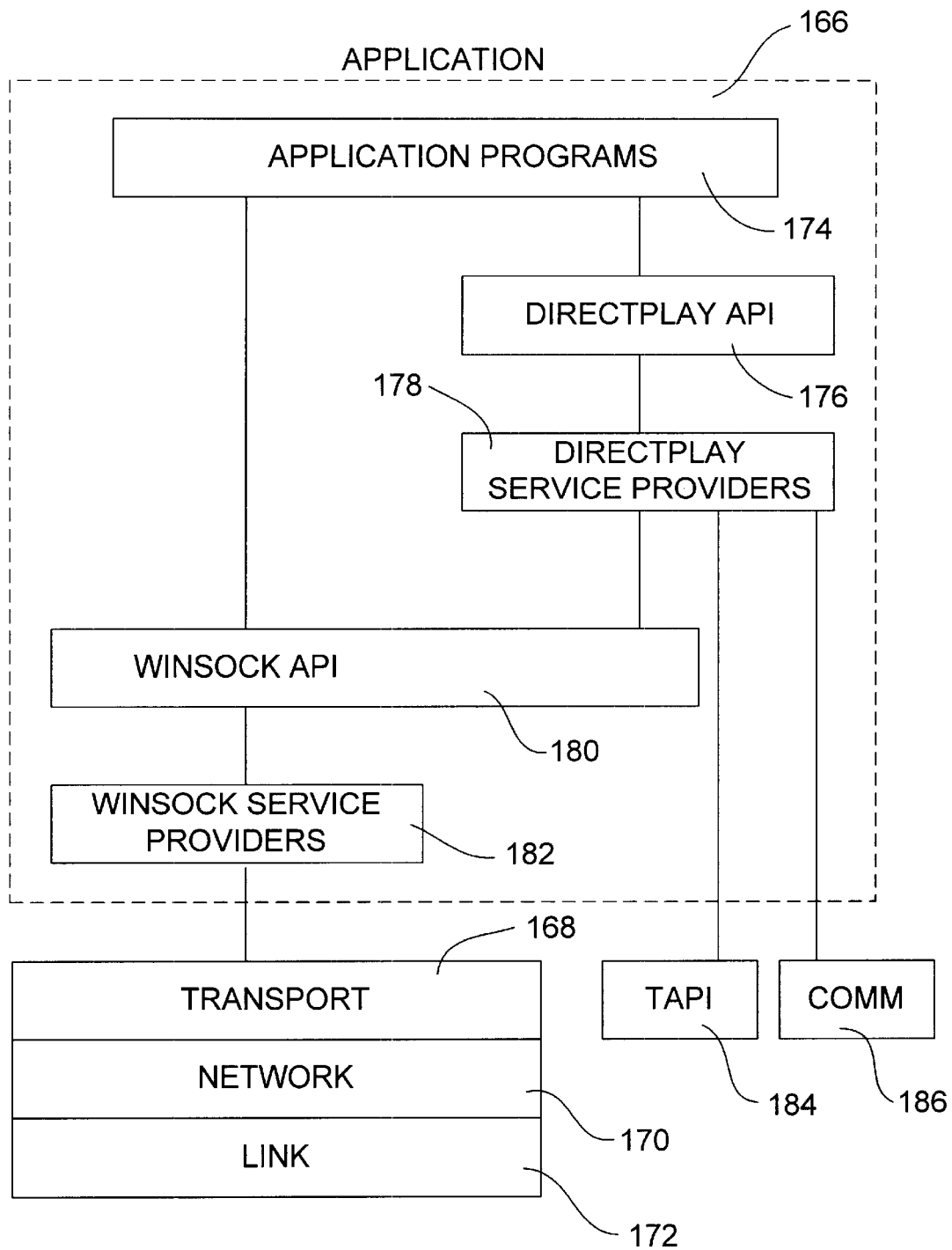
FIG. 8 is a block diagram illustrating the relationship between an application programming interface that implements the network protocol of the invention and other software components.

FIG. 8 shows how the DirectPlay[7] API fits into the network protocol layering scheme. The primary layers are still (see FIG. 1) the application layer 166, the transport layer 168, the network layer 170, and the link layer 172. The functionality of the DP protocol is contained within the Application layer 166, which includes application programs 174, DirectPlay[7] API 176, DirectPlay[7] API Service Providers 178, Winsock API 180, and Winsock Service Providers 182.

An application program that communicates with other computers over a network needs a way to be able to open and close communication links, send and retrieve data, etc. In programs that are designed for the Windows® operating system, this functionality is typically provided through a set of services contained within the Winsock API 180. Winsock stands for Windows Sockets, which is an industry standard interface specification that defines how applications communicate with TCP/IP and other network protocols. This specification includes definitions for how to use the transport protocols and how to transfer data between two computers, including the establishment of connection-oriented sessions (TCP three-way handshake) and non-connection-oriented datagrams.

As shown in FIG. 8, the Winsock API 180 uses a set of Winsock service providers 182 to connect to various networks that use different protocol suites. A service provider is a dynamiclink library (DLL) that provides the necessary code to interface between the API call and the type of network protocol suite being used for the transport and network layers. For instance, there are separate DLL service providers for TCP/IP and IPX/SPX.

While it is common for programs to directly utilize the Winsock API, it is preferable for game programs and other network communication intensive programs to indirectly access the Winsock API. through the use of the DirectPlay[7] API 176. The DirectPlay[7] API is a set of API calls that allow game applications to communicate over any network with relative ease, provided there is a DirectPlay service provider for that network type. As with the Winsock API, the DirectPlay[7] API 176 uses service providers that allow it to communicate over various network links, including modem-to-modem connections (TAPI) 184 and serial connections (COMM) 186. Rather than duplicate the built-in network services of the Winsock API 180, one of the service providers 178 provides an interface between the DirectPlay[7] API 176 and the Winsock API 180 to allow the DirectPlay[7] API to use various Winsock API functions.

Figure 9:
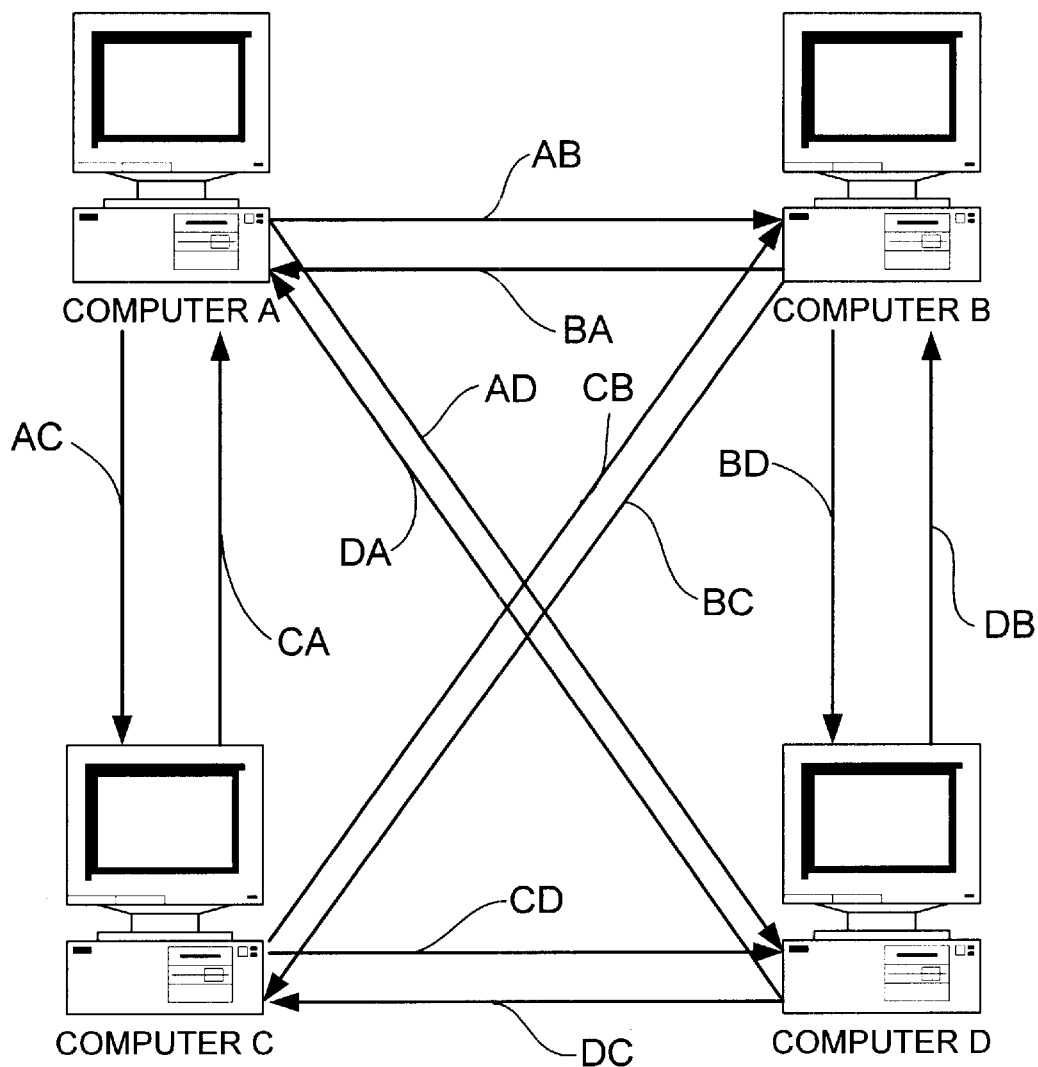
FIG. 9 shows the various communication links that are used when four players are playing in a peer-to-peer game over a network.

Through the use of the API, network applications running on computers linked via network can each take advantage of the features of the DP protocol. For instance, four players may be simultaneously playing the same game over a network, whereby the players are in a peer-to-peer relationship to one another. Therefore, a pair of outbound message links (and associated bandwidths and potentially backlogs) exist between each peer-to-peer relationship. As shown in FIG. 9, in such a relationship there are 12 outbound links between the computers. The outbound links for computer A include links AB, AC, and AD; for computer B the outbound links include BA, BC, and BD; for computer C the outbound links include CA, CB, and CD, and for computer D the outbound links include DA, DB, and DC. Each link represents a communication path between a pair of computers, whereby the messages between the computers may traverse various networks, routers, bridges, etc.

The advantages of the invention can be employed for each of the outbound links, or alternately can be employed for selected outbound links. By using the methods described above, the bandwidth, saturation, and backlog (if applicable) for each link can be established, and the send rates for communicating messages between players can be continually tuned to compensate for the present network conditions on an ongoing basis.

Overview of DP Protocol Operation

FIGS. 10–13. are flow diagrams providing an overview of the operation of the DP Protocol. As noted above, the DP Protocol maintains a clock offset between the local and remote computers in a network communication link. This clock offset, referred to as the bias, may then be used to detect link saturation more accurately. The DP Protocol is able to optimize data transfer over the link by tuning send rates so that the send rates are at or near the point of link saturation. When it detects link saturation, the DP Protocol computes the outbound bandwidth, and uses the result to determine how long to stall sending messages to clear a message backlog on the link.

Figure 10:
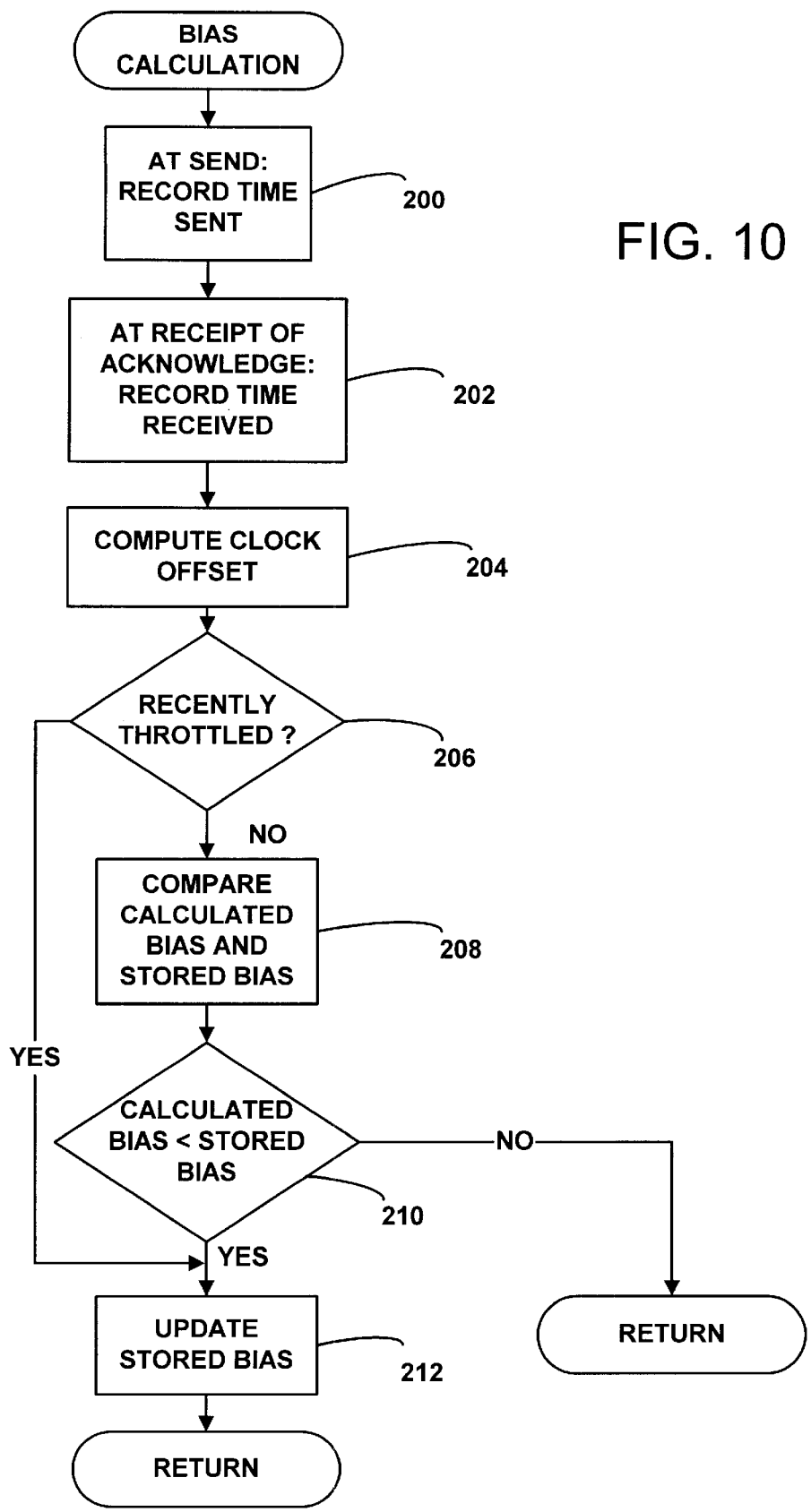
FIG. 10 is a flow diagram illustrating a method for maintaining a clock offset between two computers connected via a network communication link.

As shown in FIG. 10, the DP Protocol obtains the data it needs to compute a clock offset by recording the time it sends a message (200) and the time the remote computer receives that message (202). The DP Protocol computes the clock offset as the difference between the send and receive times (204).

The DP Protocol initializes the clock bias when it first starts sending messages and when it sends a new message after throttling the network communication link. For example, as shown in FIG. 10, if the DP Protocol has just reduced the send rate after detecting link saturation (206), it proceeds to update the bias based on the first message it sends after waiting for the stall time to elapse.

Figure 11:
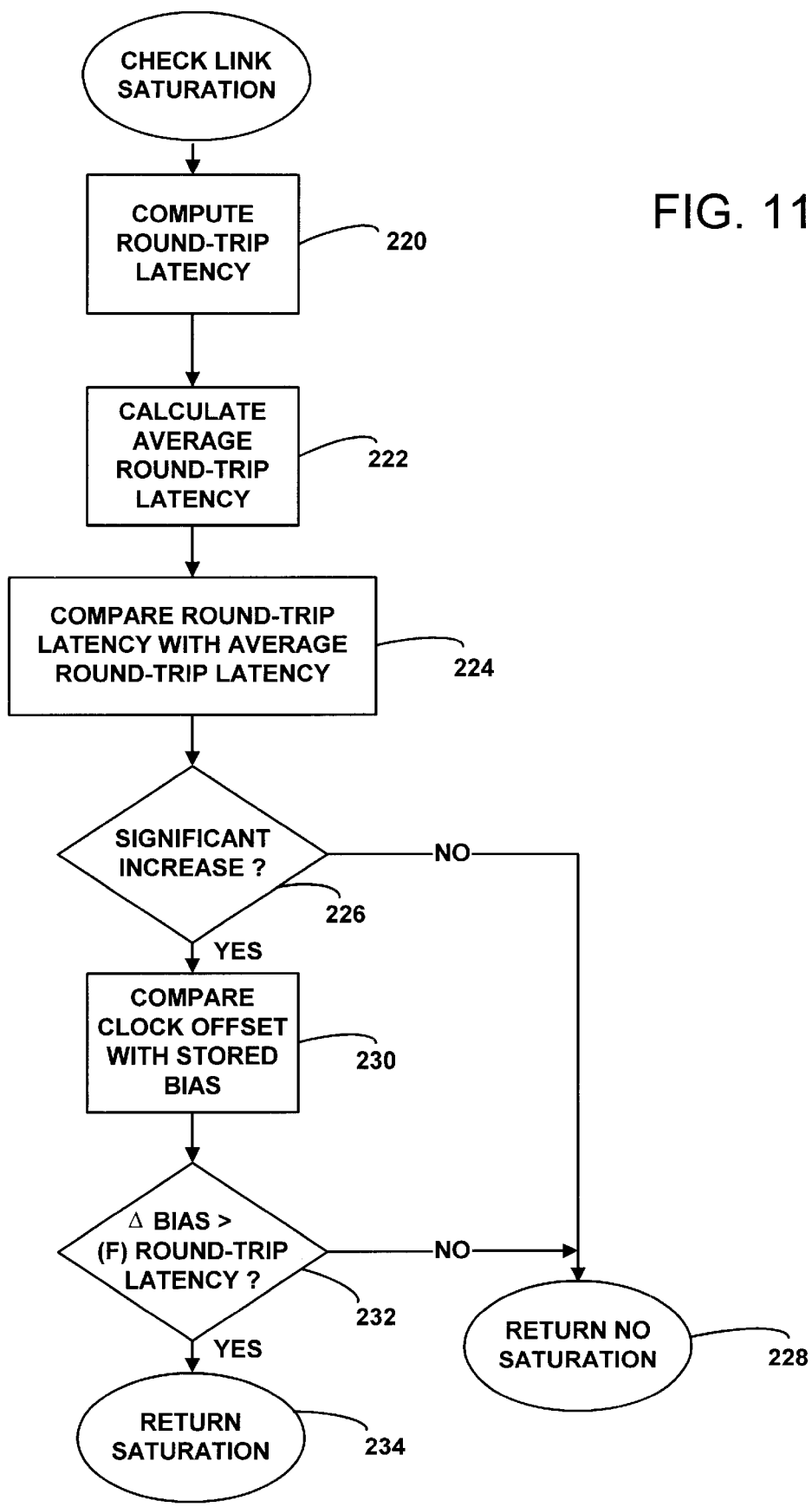
FIG. 11 is a flow diagram illustrating a method for detecting saturation of a network communication link.

The other instance for updating the stored bias value is when the DP Protocol observes that the clock bias has decreased. Each time the DP Protocol sends a new message, it computes the clock offset as shown and then compares it to the stored bias value (208). When the calculated bias value is less than the stored bias value (210), the DP Protocol replaces the stored bias value with the newly calculated bias (212). Otherwise, it maintains the current, stored bias value, As shown in FIG. 11, the DP Protocol detects link saturation in part by monitoring the round-trip latency of the messages that it sends. With each message, the DP Protocol computes the round-trip latency (220). It then updates its average round-trip latency (222) as explained above. To check for link saturation, it compares the newly computed round-trip latency with the average round-trip latency to determine whether a statistically significant increase in the roundtrip latency has occurred (224). When it does not observe a significant increase based on predetermined criteria (more than a threshold increase, such as 3 standard deviations over the average), it assumes that the link is not saturated. However, if it deems the increase to be significant, it then compares the clock offset for the current message with the stored bias (230).

When the change in bias is greater than a pre-determined fraction of the round-trip latency, the DP Protocol assumes that the increase is due to outbound latency and that the outbound path is saturated (232, 234). Otherwise, it assumes that the outbound link is not saturated (228).

Figure 12:
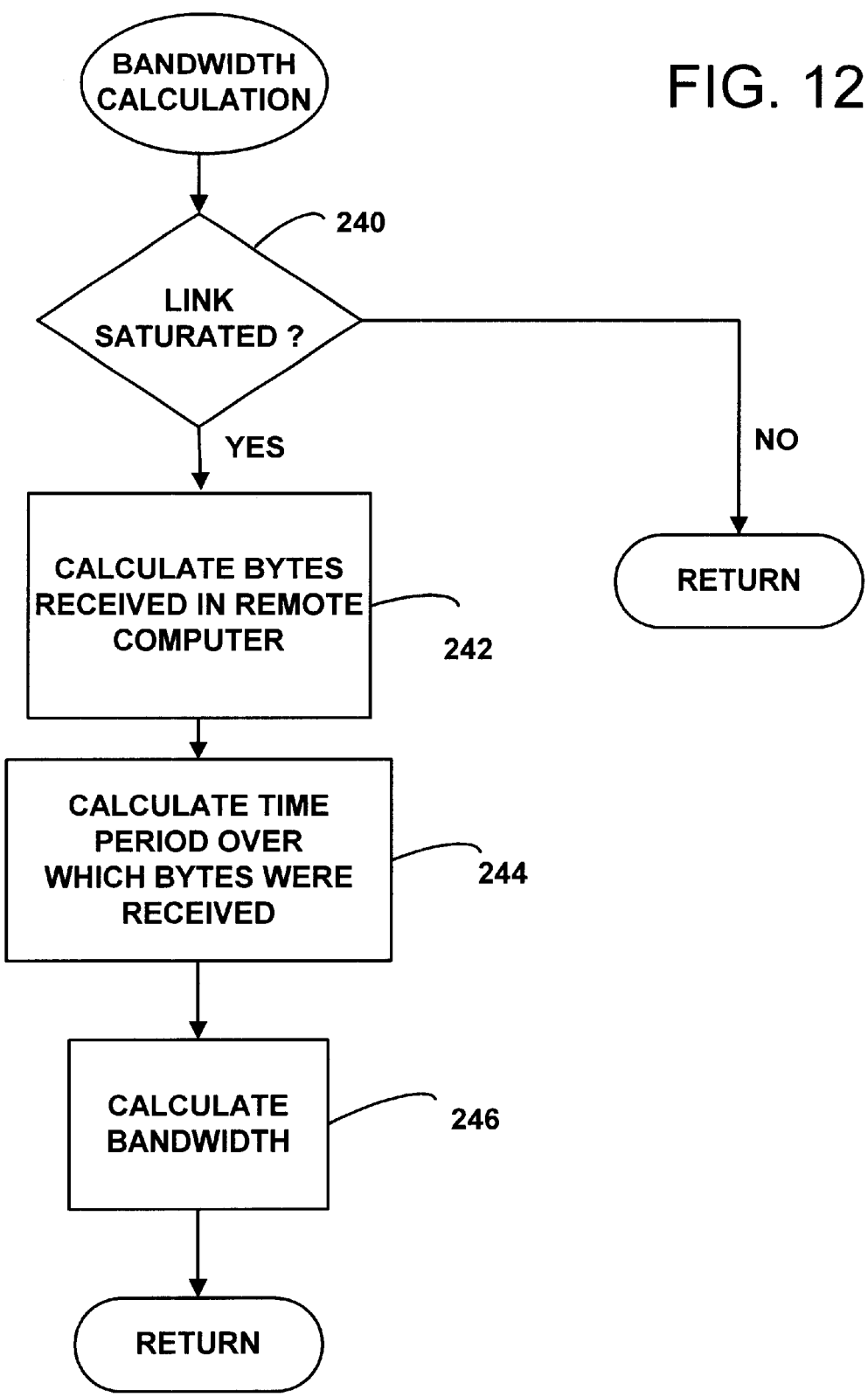
FIG. 12 is a flow diagram illustrating a method for calculating outbound bandwidth on a network communication link.

When the DP Protocol detects link saturation, it can assume that it is operating approximately at the maximum available outbound bandwidth on the network communication link. At link saturation, the DP Protocol has an opportunity to measure the outbound bandwidth. FIG. 12 illustrates a flow diagram showing how the DP Protocol computes the outbound bandwidth at this point. When it detects link saturation (240), it determines the total bytes received in the remote computer over a known time period (242). It is able to calculate the bytes received because it has recorded the amount of data received in the remote computer and the time that the data was received from the last acknowledge message. It sends a new message, recording the local send time, and amount of data sent on the link, including the new message. When the acknowledge message returns for this new message, it includes the remote receive time, and the amount of data received in the remote computer when the new message arrived. Using the receive times and data received information from these two acknowledge messages, the DP Protocol calculates the amount of data received in the remote computer during the time between these two messages (244). It then computes the bandwidth by dividing the data received in the remote computer by the time over which that data was received (246).

Figure 13:
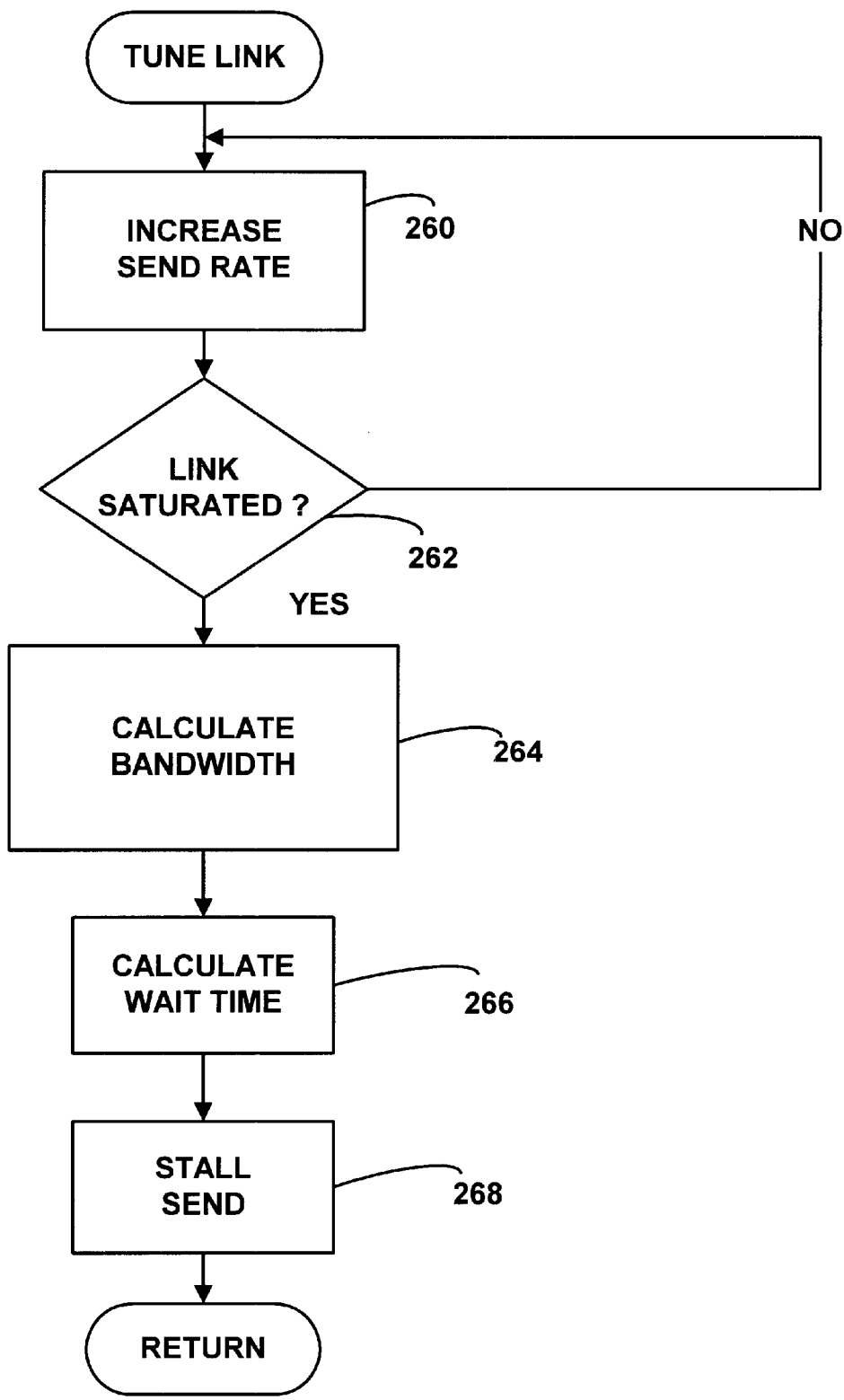
FIG. 13 is a flow diagram illustrating a method for tuning a network communication link to optimize the send rate over the link.

Using its ability to detect link saturation and compute bandwidth, the DP Protocol can optimize transfer over the network communication link by progressively increasing the send rate of messages until it detects link saturation, clearing the backlog of messages, and then setting the send rate at or near the calculated bandwidth. FIG. 13 is a flow diagram illustrating this process. The DP Protocol, as described above, implements a scheme for increasing the send rate progressively (260). When it detects link saturation (262), it proceeds to calculate the outbound bandwidth as described above (264). The DP protocol may then set the send rate at or near the calculated bandwidth. It then computes the time it needs to wait to clear the backlog based on its bandwidth calculation (266). To avoid immediately encountering link saturation, the DP protocol stalls sending any new messages until this wait time has elapsed (268).

The wait time is based on a combination of the outbound bandwidth, the latency of the link, and the amount of data sent but not acknowledged. A rough estimate of the wait time is the amount of unacknowledged data divided by the outbound bandwidth. However, this calculation does not take into account the outbound and return latencies. In particular, the local computer has sent data that the remote computer has not yet received. Additionally, the remote computer has received some data, but the local computer has not received the corresponding acknowledge messages for this data. To get a more accurate assessment of the amount of backlogged messages, the amount of un-acknowledged data should be reduced by the amount of data in the outbound and inbound paths. The amount of data in the outbound path is approximately the outbound latency multiplied by the outbound bandwidth. A similar calculation can be made for the inbound path.

As noted above, one way to compute the outbound latency is to take half the average roundtrip latency. The outbound latency may also be computed as the receive time in the remote computer (from the acknowledge message) less the local send time for a recently sent message. The data in the inbound path may be assumed to be the same as the data in the outbound path. Once the un-acknowledged data is reduced by the data in the outbound and inbound paths, the reduced number is divided by the outbound bandwidth to compute a more accurate wait time.

Exemplary Operating Environment

Figure 14:
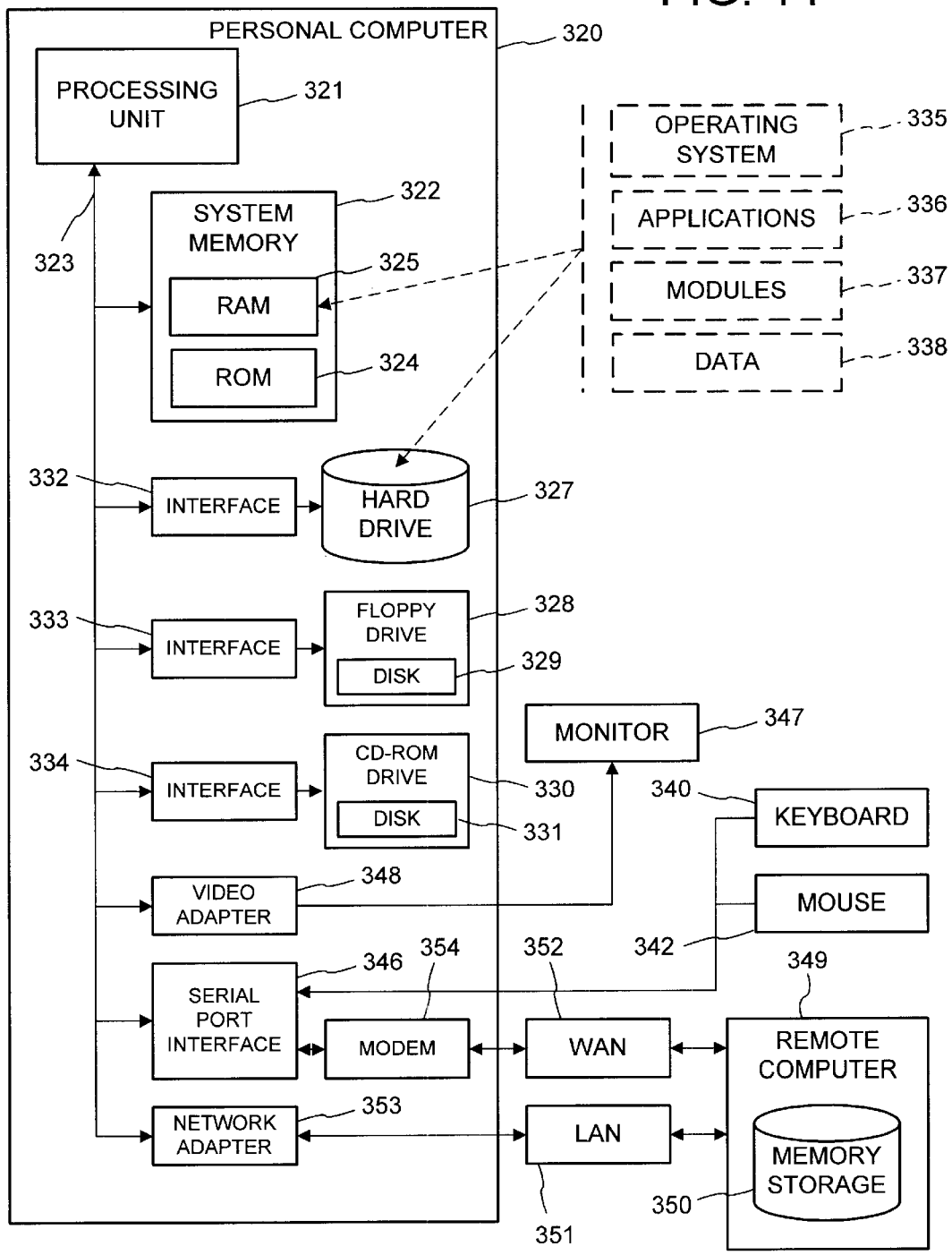
FIG. 14 is a diagram showing a general computing environment that can be used to practice the invention.

FIG. 14 and the following discussion are intended to provide a brief, general description of a suitable computing environment in which the invention may be implemented. The invention may be implemented in program modules comprising executable instructions that run on a computer.

Generally, program modules include routines, programs, components, data structures, etc. that perform particular tasks or implement particular abstract data types. The invention may be ported to other computer system configurations, including multiprocessor systems, microprocessor-based or programmable consumer electronics, minicomputers, mainframe computers, and the like. The invention may also be implemented in distributed computing environments where tasks are performed by remote processing devices that are linked through a communications network. In a distributed computing environment, program modules may be located in both local and remote memory storage devices.

FIG. 14 illustrates an example of a computer system that serves as an operating environment for the invention. The computer system includes a personal computer 320, including a processing unit 321, a system memory 322, and a system bus 323 that interconnects various system components including the system memory to the processing unit 321.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 324 and random access memory (RAM) 325. A basic input/output system 326 (BIOS), containing the basic routines that help to transfer information between elements within the personal computer 320, such as during start-up, is stored in ROM 324.

The personal computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions (program code such as dynamic link libraries, and executable files), etc. for the personal computer 320.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 325, including an operating system 335, one or more application programs 336, other program modules 337, and program data 338.

A user may enter commands and information into the personal computer 320 through a keyboard 340 and pointing device, such as a mouse 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB).

A monitor 347 or other type of display device is also connected to the system bus 323 via an interface, such as a video adapter 348. In addition to the monitor, personal computers typically include other peripheral output devices (not shown), such as speakers and printers.

The personal computer 320 operates in a networked environment using logical connections to one or more remote computers, such as a remote computer 349. The remote computer 349 may be a server, a router, a peer device or other common network node, and typically includes many or all of the elements described relative to the personal computer 320, although only a memory storage device 350 has been illustrated in FIG. 14. The logical connections depicted in FIG. 14 include a local area network (LAN) 351 and a wide area network (WAN) 352. Such networking environments are commonplace in offices, enterprise wide computer networks, intranets and the Internet.

When used in a LAN networking environment, the personal computer 320 is connected to the local network 351 through a network interface or adapter 353. When used in a WAN networking environment, the personal computer 320 typically includes a modem 354 or other means for establishing communications over the wide area network 352, such as the Internet. The modem 354, which may be internal or external, is connected to the system bus 323 via the serial port interface 346.

In a networked environment, program modules depicted relative to the personal computer 320, or portions of them, may be stored in the remote memory storage device. It will be appreciated that the network connections shown are exemplary and that other means of establishing a communications link between the computers may be used.

Conclusion

While the invention is explained with reference to specific implementation details above, the scope of the invention is not limited to these implementation details. A number of variations in the design are possible without departing from the scope of the invention. For example, the protocol described above is provided as part of an application programming interface with network-independent functions for sending and receiving messages to a remote computer. However, it is not necessary that the protocol be provided in an API. Alternatively, it could be implemented in an application program, an operating system, or network adapter driver software.

The DP Protocol has a number of unique features such as maintaining a clock offset between local and remote computers on a network communication link, detecting link saturation, calculating outbound bandwidth, and tuning send rates based on detection of link saturation and the outbound bandwidth. Each of these capabilities is unique and may be used alone or in combination in a variety of different applications.

In calculating a clock offset between local and remote computers, the implementation of the DP Protocol makes certain design choices that need not be implemented in all methods or systems that incorporate the invention. For example, in the implementation described above, the clock bias is continually updated when a reduction in the bias is observed. Another approach is to maintain the bias asia short-term average over some time window of recently sent/acknowledged messages.

The precise criteria for detecting link saturation may be altered as well. A significant increase in the round-trip latency is a good indicator of link saturation. However, the manner in which the significance of an increase is determined may vary. The implementation described above determines an increase to be significant based on a statistical analysis involving the average and standard deviation of the round-trip latency. The increase in round-trip latency may also be deemed significant if it increases more than some pre-determined constant value, for example. The implementation described above also uses a change in bias relative to the round-trip latency to isolate outbound link saturation. Each criterion is unique and may be used either alone or in combination to detect link saturation.

Finally, the specific format of the messages used to record local send and remote receive times and data received on the remote computer may vary as well. The specific message protocol illustrated above is only one example.

In view of the many possible embodiments to which the principles of the invention may be applied, it should be recognized that the illustrated implementations are only an example of the invention and should not be taken as a limitation on the scope of the invention. Rather, the scope of the invention is defined by the following claims. I therefore claim as my invention all that comes within the scope and spirit of these claims.

I claim:

1. A method for optimizing the use of available bandwidth across a computer network, the network facilitating a link between a first computer in communication with a second computer, the link having a variable bandwidth, the method comprising:

(a) sending messages from the first computer to the second computer while increasing a rate at which messages are sent until saturation of the link is detected, the link saturation creating a backlog of messages across the link;

(b) calculating bandwidth of the link in response to detecting that the link is saturated;

(c) reducing the rate at which messages are sent to the calculated bandwidth;

(d) calculating a wait time to clear out the backlogged messages;

(e) stalling issuance of messages from the first computer to the second computer for a time equal to the calculated wait time;

repeating steps (a)–(e) during continued communications from the first computer to the second computer.

2. The method of claim 1, wherein:

each message sent from the first computer to the second computer is an outbound message having a unique message number, a send time for each outbound message is recorded in the first computer, each outbound message is acknowledged by a corresponding acknowledge message sent from the second computer to the first computer, and further including:

calculating roundtrip latency by calculating a difference between a send time of an outbound message and a local receive time of the corresponding acknowledge message in the first computer; and averaging roundtrip latencies for outbound messages;

wherein link saturation is determined, at least in part, by observing a statistically-significant deviation between the average roundtrip latency and the roundtrip latency for an individual message.

3. The method of claim 2, wherein the statistically-significant deviation is at least three standard deviations.

4. The method of claim 2 wherein each acknowledge message includes a remote receive time indicating a time according to a clock on the second computer that the corresponding outbound message was received;

and further including:

determining whether an increase in the roundtrip latency is due to outbound latency by:

calculating a clock bias for outbound messages by calculating a difference between the send and remote receive times for the messages, calculating a change in the clock bias; and evaluating whether the change in the clock bias is more than a predetermined fraction of the roundtrip latency;

wherein an increase in roundtrip latency is considered to be attributable to an increase in outbound latency when the change in clock bias is more than the predetermined fraction of the roundtrip latency.

5. A computer-readable medium having computer-executable instructions for performing the steps recited in claim 1.

6. A method for maintaining a clock offset between a first computer and a second computer, the first and second computers linked in communication across a network and each having a clock, the method comprising:

sending a first message from the first computer to the second computer on a network communication link;

recording a message send time, which is the time the message is sent according to the first computer's clock;

receiving an acknowledgment message acknowledging receipt of the message from the second computer to the first computer that includes a remote receive time, which is the time the second computer received the message according to the second computer's clock;

computing a clock offset by calculating a difference between the remote receive time and the message send time;

monitoring the link for link saturation;

in response to detecting link saturation, reducing a send rate;

re-computing the clock offset for a new message sent after reducing the send rate; and calculating a wait time, the wait time being a measure of time that issuance of the new message is stalled after reducing the send rate to clear a backlog of messages on the link.

7. The method of claim 6 further including:

calculating outbound bandwidth in response to detecting link saturation; and calculating the wait time based on the outbound bandwidth and latency of the link;

wherein outbound bandwidth is computed from acknowledge messages sent from the second computer, including receive times recorded at the remote computer and an amount of data received at the remote computer corresponding to the receive times; and the latency is derived from recording local send times of messages sent from the first computer and acknowledge messages that the second computer sends to acknowledge receipt of the messages from the first computer.

8. A computer-readable medium having computer-executable instructions for performing the steps recited in claim 6.

9. A method for maintaining a clock offset between a first computer and a second computer, the first and second computers linked in communication across a network and each having a clock, the method comprising:

sending a first message from the first computer to the second computer on a network communication link;

recording a message send time, which is the time the message is sent according to the first computer's clock;

receiving an acknowledgment message acknowledging receipt of the message from the second computer to the first computer that includes a remote receive time, which is the time the second computer received the message according to the second computer's clock;

computing a clock offset by calculating a difference between the remote receive time and the message send time;

monitoring the link for link saturation;

in response to detecting link saturation, reducing a send rate;

re-computing the clock offset for a new message sent after reducing the send rate;

calculating a backlog of messages sent on the link;

stalling issuance of the new message until the calculated backlog is cleared; and re-computing the clock offset for the new message sent after clearing the calculated backlog.

10. A method for tuning a communications link across a network linking a first local computer to a second remote computer, the local and remote computers each having a clock, the method comprising:

(a) sending outbound messages from the local computer to the remote computer, wherein each message has a message identifier, a send time is recorded for each message according to the local computer clock, and the messages are sent at a progressively increasing rate until a link saturation condition is detected, the link saturation condition causing a backlog of messages;

(b) receiving acknowledge messages from the remote computer acknowledging receipt of the outbound messages by the remote computer, the acknowledge messages including a remote receive time marking a time a corresponding outbound message was received according to the remote computer clock, the message identifier of the corresponding outbound message, and a count of bytes received on the remote computer;

(c) recording a local receive time for each acknowledge message received in the local computer according to the local computer's clock;

(d) determining a roundtrip latency for each outbound message based on the send time recorded in (a) and the local receive time in (c);

(e) calculating an average roundtrip latency based at least on the roundtrip latency determined in step (d);

(f) calculating a clock bias between the local computer clock and the remote computer clock by calculating a difference between the local send time and the remote receive time for an outbound message;

(g) checking for a link saturation condition by comparing roundtrip latency for a recent message with the average roundtrip latency and comparing a change in the clock bias with the roundtrip latency for the recent message to determine whether an increase in roundtrip latency is due to an increase in outbound latency;

(h) in response to detecting the link saturation condition, computing outbound bandwidth in the local computer by dividing a number of bytes received in the remote computer as indicated in first and second acknowledge messages by a time period over which the number of bytes were received as indicated in the remote receive times of the first and second acknowledge messages;

(i) calculating a wait time, the wait time being an amount of time that issuance of outbound messages should be stalled to clear out the backlogged messages on the link, and stalling issuance of messages for the wait time; and (n) adjusting a message send rater to approximate the calculated outbound bandwidth.

11. A computer-readable medium having computer-executable instructions for performing the steps recited in claim 10.

12. A method for calculating the outbound bandwidth of a network linking a first local computer to a second remote computer, the local and remote computers each having a clock, the method comprising:

(a) sending outbound messages from the local computer to the remote computer, wherein each message has a message identifier and the messages are sent at a progressively increasing rate until a link saturation condition is detected, the link saturation condition causing a backlog of messages;

(b) receiving acknowledge messages from the remote computer acknowledging receipt of the outbound messages by the remote computer, the acknowledge messages including a remote receive time marking a time the outbound message was received according to the remote computer clock, the message identifier of the corresponding outbound message, and a count of bytes received on the remote computer; and (c) in response to detecting the link saturation condition, computing outbound bandwidth in the local computer by dividing a number of bytes received in the remote computer as indicated in first and second acknowledge messages by a time period over which the number of bytes were received as indicated in the remote receive times of the first and second acknowledge messages.

13. A computer-readable medium having computer-executable instructions for performing the steps recited in claim 12.

14. The method of claim 12 further comprising adjusting the message send rate of messages sent from the local computer to approximate the calculated outbound bandwidth.

15. The method of claim 12 further including: calculating a wait time, the wait time being a measure of time that issuance of the new message is stalled after reducing the send rate to clear a backlog of messages on the link.

16. A computer-readable medium having stored thereon a first data structure comprising:

(a) a first data field including a message identifier; and (b) a second data field including a message body; and further including a second data structure comprising:

(c) a first data field including a message identifier;

(d) a second data field including a count of data received in a second computer from a first computer; and (e) a third data field including a timestamp corresponding to the time a message is received on the second computer;

wherein outbound messages comprising the first data structure are sent between the first computer and the second computer, the second computer acknowledging receipt of the outbound messages by sending an acknowledge message comprising the second data structure to the first computer, the message identifiers of the first and second data structures being used to match the outbound messages with the acknowledge messages to detect saturation of a link between the first and second computer via isolating which part of roundtrip latency is attributable to an outbound or return path.

17. A method for determining network link saturation in a communications link across a network linking a first local computer to a second remote computer, the local and remote computers each having a clock, the method comprising:

(a) sending outbound messages from the local computer to the remote computer, wherein each message has a message identifier, a local send time is recorded for each message according to the local computer clock, and the messages are sent at a progressively increasing rate until a link saturation condition is detected, the link saturation condition causing a backlog of messages;

(b) receiving acknowledge messages from the remote computer acknowledging receipt of the outbound messages by the remote computer, the acknowledge messages including a remote receive time marking a time the outbound message was received according to the remote computer clock, the message identifier of the corresponding outbound message;

(c) recording a local receive time for each acknowledge message received in the local computer according to the local computer's clock;

(d) determining a roundtrip latency for each outbound message based on the local send time recorded in (a) and the local receive time in (c);

(e) calculating an average roundtrip latency based at least on the roundtrip latency determined in step (d);

(f) calculating a clock bias between the local computer clock and the remote computer clock by calculating a difference between the local send time and the remote receive time for an outbound message; and (g) checking for a link saturation condition by comparing roundtrip latency for a recent message with the average roundtrip latency and comparing a change in the clock bias with the roundtrip latency for the recent message to determine whether an increase in roundtrip latency is due to an increase in outbound latency.

18. A computer-readable medium having computer-executable instructions for performing the steps recited in claim 17.

* * * * *

UNITED STATES PATENT AND TRADEMARK OFFICE
CERTIFICATE OF CORRECTION

PATENT NO. : 6,587,875 B1
DATED : July 1, 2003
INVENTOR(S) : Ogus

It is certified that error appears in the above-identified patent and that said Letters Patent is hereby corrected as shown below:

Title Page,
Item [56], References Cited, OTHER PUBLICATIONS,
"A Collection of Papers" reference, "http://netweb.usc-edu/" should read -- http://netweb.usc.edu/ --.
"Transmission Control" reference, "univ.lemans." should read -- univ-lemans --; and "793,index.html" should read -- 793.index.html --.
"V. Jacobsen, Barden R., reference, "Barden" should read -- Braden --.
"Direct Play 4" reference, "Ptotocol" should read -- Protocol --.

Column 2,
Line 42, "resulting in: increased" should read -- resulting in increased --.

Column 4,
Line 14, "FIP" should read -- FTP --.
Line 47, ".showing" should read -- showing --.
Line 54, "protocol" should read -- *protocol* --.
Line 54, "protocol suite" should read -- *protocol suite* --.
Line 62, "TCPIIP" should read --TCP/IP--.

Column 5,
Line 21, "application" should read -- *application* --.
Line 22, "transport" should read -- *transport* --.
Line 22, "network" should read -- *network* --.
Line 22, "link" should read -- *link* --.
Line 25, "data-link" should read-- *data-link* --.
Line 26, "network interface" should read -- *network interface* --.
Line 31, "internet" should read-- *internet* --.

Column 6,
Line 9, "EP" should read -- IP --.
Line 25, "FTS" should read --FTP--.
Line 32, "originals, networks" should read -- original networks --.
Line 33, "internets" should read -- *internets* --.
Line 39, "router." should read -- *router.* --.
Line 57, "end-to-end" should read -- *end-to-end* --.
Line 61, "EP" should read --IP --.

UNITED STATES PATENT AND TRADEMARK OFFICE
CERTIFICATE OF CORRECTION

PATENT NO. : 6,587,875 B1
DATED : July 1, 2003
INVENTOR(S) : Ogus

It is certified that error appears in the above-identified patent and that said Letters Patent is hereby corrected as shown below:

Column 7,
Line 12, "play TCP" should read -- play. TCP --.
Line 18, "multihomed" should read -- *multihomed* --.
Line 28, "bridge." should read -- *bridge.* --.
Line 55, "the." should read -- the -.

Column 8,
Line 4, "protocol stack" should read -- *protocol stack* --.
Line 14, "segment" should read -- *segment* --.
Line 18, "IP datagram" should read -- *IP datagram* --.
Line 22, "frame" should read -- *frame* --.
Line 26, "Ethernet frame" should read -- *Ethernet frame* --.
Line 34, "EP" should read -- IP --.

Column 10,
Lines 50-51, "cbRECEfVED" should read -- cbRECEIVED --.
Lines 54-55, "tRECEfVE" should read -- tRECEIVE --.

Column 11,
Line 27, "an" should read -- can --.
Line 28, "racking" should read -- tracking --.
Line 42, "data, is" should read -- data is --.

Column 13,
Line 64, "ABias" should read -- $\Delta$Bias --.

Column 14,
Line 14, "loms" should read -- 10 ms --.
Line 25, "ABias" should read -- $\Delta$Bias --.

Column 15,
Line 37, "bouridary" should read -- boundary --.
Line 58, "back-logged" should read -- backlogged --.
Line 63, "the. link" should read -- the link --.
Line 66, "the.link" should read -- the link --.

UNITED STATES PATENT AND TRADEMARK OFFICE
CERTIFICATE OF CORRECTION

PATENT NO. : 6,587,875 B1
DATED : July 1, 2003
INVENTOR(S) : Ogus

It is certified that error appears in the above-identified patent and that said Letters Patent is hereby corrected as shown below:

Column 16,
Line 42, "ΔBias Bias" should read -- ΔBias = Bias --.
Line 64, "bw" should read -- *bw* --.
Line 65, "theremote" should read -- the remote --.

Column 17,
Line 6, "51283,742" should read -- 51,283,742 --.
Line 12, "bytes/sec 1458" should read -- bytes/sec = 1458 --.
Line 37, "nto" should read -- into --.
Line 39, "rotocol" should read -- protocol --.

Column 18,
Line 8, "API. through" should read -- API through --.

Column 19,
Line 12, "value," should read -- value. --.

Column 22,
Line 28, "asia" should read -- as a --.

Column 25,
Line 43, "rater" should read -- rate --.

Signed and Sealed this

Fourteenth Day of December, 2004

JON W. DUDAS
*Director of the United States Patent and Trademark Office*